US012789836B2

(12) United States Patent
Kobashi et al.

(10) Patent No.: US 12,789,836 B2
(45) Date of Patent: Nov. 10, 2026

(54) ROAD IRREGULARITY DETECTION

(71) Applicant: Nissan North America, Inc., Franklin, TN (US)

(72) Inventors: Atsuhide Kobashi, Sunnyvale, CA (US); Christopher Ostafew, Mountain View, CA (US)

(73) Assignee: Nissan North America, Inc., Franklin, TN (US)

( * ) Notice: Subject to any disclaimer, the term of this patent is extended or adjusted under 35 U.S.C. 154(b) by 357 days.

(21) Appl. No.: 18/228,573

(22) Filed: Jul. 31, 2023

(65) Prior Publication Data

US 2025/0042430 A1 Feb. 6, 2025

(51) Int. Cl.

| | |
|---|---|
| ***B60W 40/06*** | (2012.01) |
| ***B60W 50/14*** | (2020.01) |
| ***B60W 60/00*** | (2020.01) |
| ***G06V 20/58*** | (2022.01) |

(52) U.S. Cl.

CPC .......... *B60W 60/001* (2020.02); *B60W 40/06* (2013.01); *B60W 50/14* (2013.01); *G06V 20/58* (2022.01)

(58) Field of Classification Search

CPC .............. B60W 40/06; B60W 2552/35; B60G 17/0165; B60G 2400/82; B60G 2400/821

See application file for complete search history.

(56) References Cited

U.S. PATENT DOCUMENTS

2014/0195112 A1* 7/2014 Lu ........................ B60G 17/015 703/2
2015/0073654 A1* 3/2015 Foltin .................... G01B 11/24 356/612
2016/0034771 A1* 2/2016 Schamp ................. G06V 20/56 348/148
2023/0169858 A1* 6/2023 Mekki ................... G01S 7/4802 340/904

* cited by examiner

*Primary Examiner* — Kenneth J Malkowski
(74) *Attorney, Agent, or Firm* — Young Basile Hanlon & MacFarlane, P.C.

(57) ABSTRACT

Point cloud data from a sensor of a vehicle at different distances ahead of the vehicle are accumulated over time. Density data of the point cloud data at the different distances ahead of the vehicle are identified. A road irregularity is identified based on the density data. The vehicle is controlled in response to the irregularity.

18 Claims, 10 Drawing Sheets

ROAD IRREGULARITY DETECTION

TECHNICAL FIELD

This disclosure relates generally to autonomous driving, and more particularly to detecting road irregularities.

BACKGROUND

A vehicle, such as an autonomous vehicle (AV), may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle. On occasion, a road irregularity may prevent smooth and safe operation of the vehicle.

SUMMARY

A first aspect of the disclosed implementations is a method for detecting a road irregularity. The method includes accumulating, over time, point cloud data from a sensor of a vehicle at different distances ahead of the vehicle; identifying density data of the point cloud data at the different distances ahead of the vehicle; identifying the road irregularity based on the density data; and controlling the vehicle in response to the irregularity.

A second aspect of the disclosed implementations is an apparatus for detecting a road irregularity. The apparatus includes one or more sensors of a vehicle, a non-transitory computer readable medium, and a processor. The processor is configured to execute instructions stored on the non-transitory computer readable medium to: accumulate, over time, point cloud data from a sensor of the vehicle at different distances ahead of the vehicle; identify density data of the point cloud data at the different distances ahead of the vehicle; identify the road irregularity based on the density data; and control the vehicle in response to the irregularity.

A third aspect of the disclosed implementations is a method for detecting a road irregularity. The method includes binning at least some of sensor data obtained from a sensor of a vehicle at different distances ahead of the vehicle into distance bins; determining a respective density data of a respective distance bin for one or more of the distance bins; plotting a density plot having the respective density data on a y-axis and a respective distance ahead of the vehicle on a x-axis; identifying an anomaly in the density plot based on a comparison of the respective density data to expected density data at the respective distance ahead of the vehicle; determining an existence of the road irregularity based on the anomaly; and altering a driving behavior of the vehicle based on the existence of the road irregularity. Each of the distance bins can correspond to a defined distance interval within a threshold distance ahead of the vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
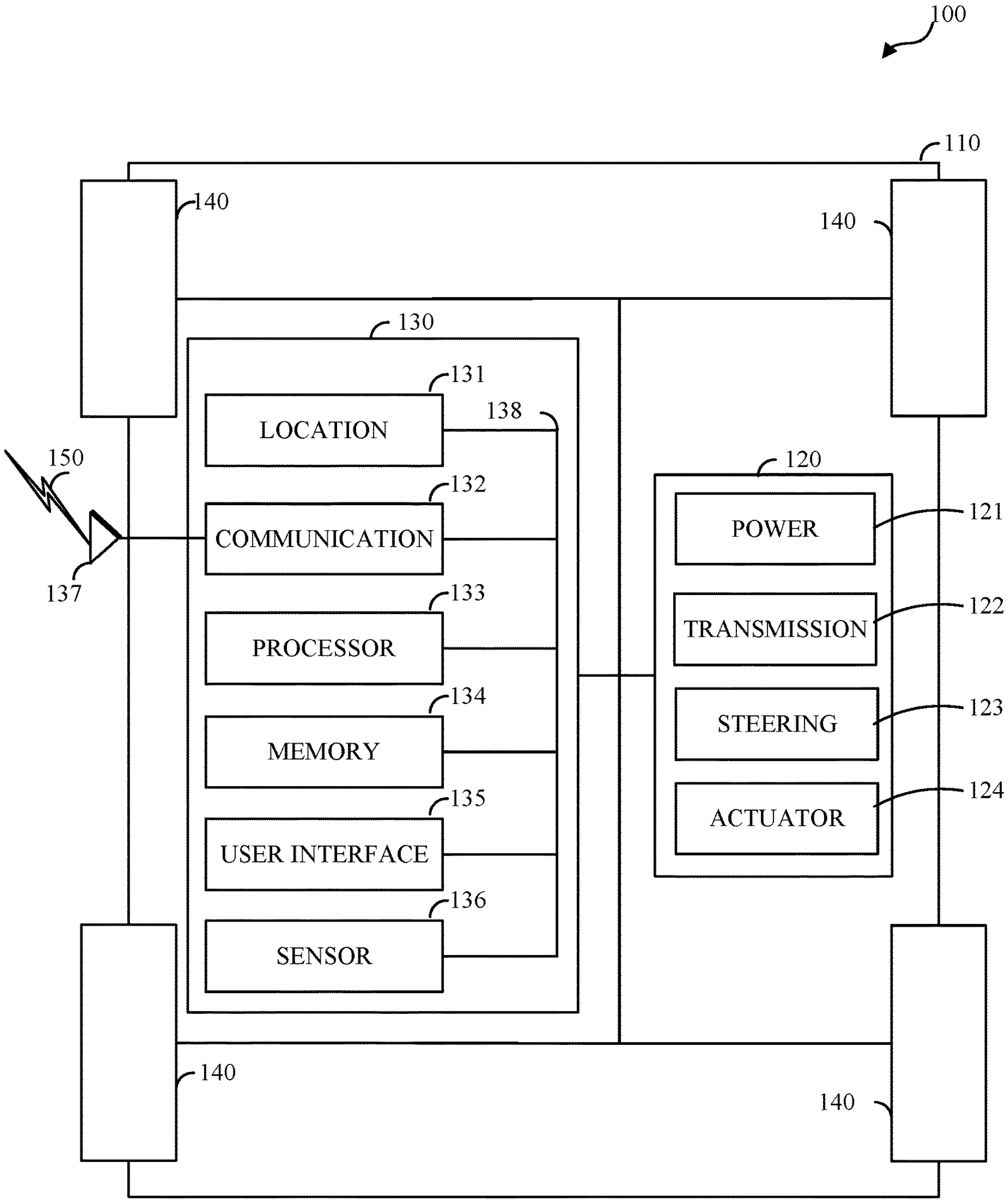
FIG. 1 is a diagram of an example of a vehicle in which the aspects, features, and elements disclosed herein may be implemented.

The quality of road surfaces plays a crucial role in ensuring a comfortable and safe driving experience while also enhancing the longevity of vehicles. Smooth and consistent roads promote driving comfort, protect the durability of vehicles, and contribute to overall road safety. However, road irregularities can pose significant challenges for autonomous driving systems by inducing abrupt changes in vehicle speed if not detected in a timely manner, or by causing the system to fail in responding appropriately, such as failing to slow down or avoid road irregularities. Failure to promptly address road irregularities in AVs can lead to uncomfortable and unsafe ride experiences for the occupants. These road irregularities can encompass various obstacles such as speed bumps, hills, cliffs, drop-offs, sudden changes in road elevation, potholes, and other surface deformations. Properly managing and responding to these irregularities is essential to ensure the optimal functioning and safety of AVs.

Despite advancements in vehicle technology, detecting road irregularities remains a significant challenge. Road irregularities can often go undetected until the last moment, leading to potential accidents or damage to the vehicle. For example, it may be difficult for sensors or cameras to detect a speed bump that is unpainted, since there is no way to visually distinguish a road surface from the speed bump, especially under difficult lighting conditions (e.g., lighting condition at nighttime). For example, radar resolution may not be granular enough to result in (e.g., provide) different returns from the ground versus the speed bump. Accordingly, current detection systems, including human observation and existing vehicle sensors, are limited in their ability to detect road irregularities accurately and effectively.

Implementations according to this disclosure can be used for detecting road irregularities. Point cloud data obtained from a LiDAR sensor at different distances ahead of a vehicle can be accumulated, corresponding density data of sensor data (e.g., the point cloud data) can be identified, and the road irregularity can be identified based on the density data. When a road irregularity is identified, an AV may be controlled to modify a current trajectory, a speed plan, or some aspect for the vehicle. For example, the vehicle may be slowed down. For example, the trajectory or pose of the vehicle may be laterally shifted so as to avoid a pothole.

In some implementations, in order to identify the corresponding density data of the point cloud data, at least some of the point cloud data can be binned into distance bins where each of the distance bins corresponds to a defined distance interval within a threshold distance ahead of the vehicle. Thereafter, the respective density data of a respective distance bin for one or more of the multiple distance bins can be determined. In some implementations, a density plot can be generated based on the respective density data.

FIG. 1 is a diagram of an example of a vehicle in which the aspects, features, and elements disclosed herein may be implemented. In the embodiment shown, a vehicle 100 includes various vehicle systems. The vehicle systems include a chassis 110, a powertrain 120, a controller 130, and wheels 140. Additional or different combinations of vehicle systems may be used. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

The powertrain 120 shown by example in FIG. 1 includes a power source 121, a transmission 122, a steering unit 123, and an actuator 124. Any other element or combination of elements of a powertrain, such as a suspension, a drive shaft, axles, or an exhaust system may also be included. Although shown separately, the wheels 140 may be included in the powertrain 120.

The power source 121 includes an engine, a battery, or a combination thereof. The power source 121 may be any device or combination of devices operative to provide energy, such as electrical energy, thermal energy, or kinetic energy. In an example, the power source 121 includes an engine, such as an internal combustion engine, an electric motor, or a combination of an internal combustion engine and an electric motor, and is operative to provide kinetic energy as a motive force to one or more of the wheels 140. Alternatively or additionally, the power source 121 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 receives energy, such as kinetic energy, from the power source 121, transmits the energy to the wheels 140 to provide a motive force. The transmission 122 may be controlled by the controller 130, the actuator 124, or both. The steering unit 123 may be controlled by the controller 130, the actuator 124, or both and control the wheels 140 to steer the vehicle. The actuator 124 may receive signals from the controller 130 and actuate or control the power source 121, the transmission 122, the steering unit 123, or any combination thereof to operate the vehicle 100.

In the depicted embodiment, the controller 130 includes a location unit 131, an electronic communication unit 132, a processor 133, a memory 134, a user interface 135, a sensor 136, and a communication interface 137. Fewer of these elements may exist as part of the controller 130. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 is operatively coupled with one or more of the location unit 131, the memory 134, the communication interface 137, the electronic communication unit 132, the user interface 135, the sensor 136, and the powertrain 120. For example, the processor may be operatively coupled with the memory 134 via a communication bus 138.

The memory 134 includes any tangible non-transitory computer-usable or computer-readable medium, capable of, for example, containing, storing, communicating, or transporting machine readable instructions, or any information associated therewith, for use by or in connection with any processor, such as the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The electronic communication unit 132 is configured to transmit or receive signals via a wired or wireless electronic communication medium 150, such as via the communication interface 137. Although not explicitly shown in FIG. 1, the electronic communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single electronic communication unit 132 and a single communication interface 137, any number of communication units and any number of communication interfaces may be used. In some embodiments, the electronic communication unit 132 includes a dedicated short range communications (DSRC) unit, an on-board unit (OBU), or a combination thereof.

The location unit 131 may determine geolocation information, such as longitude, latitude, elevation, direction of travel, or speed, of the vehicle 100. In an example, the location unit 131 includes a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include both an audio interface for performing audio communication with a person and a touch display for performing visual and touch-based communication with the person. The user interface 135 may include multiple displays, such as multiple physically separate units, multiple defined portions within a single physical unit, or a combination thereof.

The sensors 136 are operable to provide information that may be used to control the vehicle. The sensors 136 may be an array of sensors. The sensors 136 may provide information regarding current operating characteristics of the vehicle 100, including vehicle operational information. The sensors 136 can include, for example, a LiDAR sensor, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 100.

The sensors 136 include one or more sensors 136 that are operable to obtain information regarding the physical environment (e.g., ground points, non-ground points) surrounding the vehicle 100, such as operational environment information. For example, one or more sensors may detect road geometry, such as lane lines, and obstacles, such as fixed obstacles, vehicles, and pedestrians. The sensors 136 can be or include one or more video cameras, laser-sensing systems, light pulse sensing system, infrared-sensing systems, acoustic-sensing systems, or any other suitable type of on-vehicle environmental sensing device, or combination of devices, now known or later developed. In some embodiments, the sensors 136 and the location unit 131 are combined.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel that is pivoted to a steering angle under control of the steering unit 123, a propelled wheel that is torqued to propel the vehicle 100 under control of the transmission 122, or a steered and propelled wheel that may steer and propel the vehicle 100.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 130 may include the autonomous vehicle control unit.

When present, the autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network information representing the vehicle transportation network, or a combination thereof, and may control or operate the vehicle 100 to traverse the vehicle transportation network in accordance with the route. For example, the autonomous vehicle control unit may output the route of travel to the trajectory controller to operate the vehicle 100 to travel from the origin to the destination using the generated route.

Figure 2:
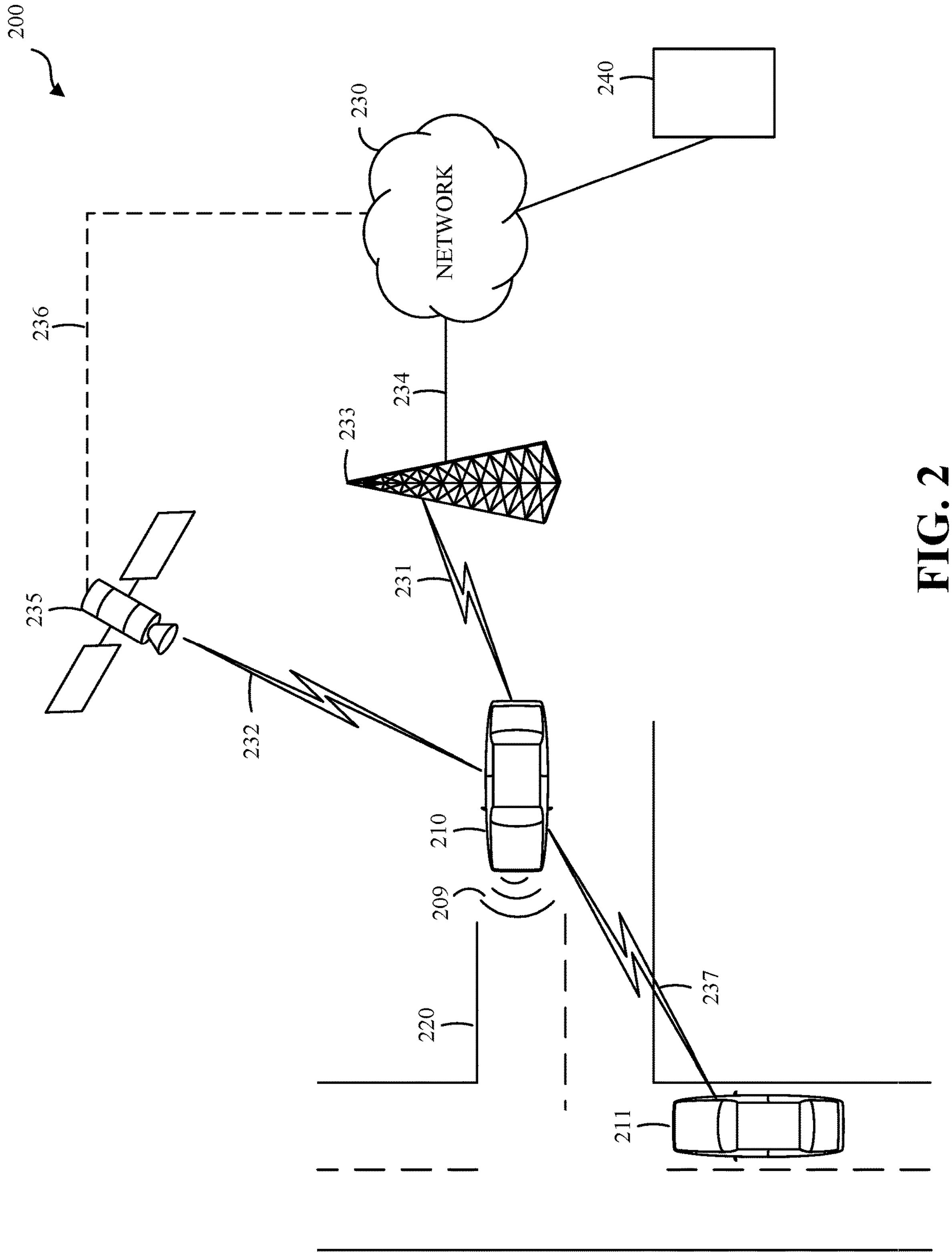
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which travels via one or more portions of the vehicle transportation network 220, and communicates via one or more electronic communication networks 230. Although not explicitly shown in FIG. 2, a vehicle may traverse an off-road area.

The electronic communication network 230 may be, for example, a multiple access system that provides for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the electronic communication network 230.

In some embodiments, a vehicle 210/211 may communicate via a wired communication link (not shown), a wireless communication link 231/232/237, or a combination of any number of wired or wireless communication links. As shown, a vehicle 210/211 communicates via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, an ultraviolet (UV) link, or any link capable of providing for electronic communication.

A vehicle 210/211 may communicate with another vehicle 210/211. For example, a host, or subject, the vehicle 210 (HEV) may receive one or more automated inter-vehicle messages, such as a basic safety message (BSM), from a remote, or target, vehicle (RV) 211, via a direct communication link 237, or via the electronic communication network 230. The remote vehicle 211 may broadcast the message to host vehicles within a defined broadcast range, such as 300 meters. In some embodiments, the host vehicle (e.g., the vehicle 210) may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the electronic communications network 230 via an access point 233. The access point 233, which may include a computing device, is configured to communicate with a vehicle 210, with the electronic communication network 230, with one or more communication devices 240, or with a combination thereof via wired or wireless communication links 231/234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 210 may communicate with the electronic communications network 230 via a satellite 235, or other non-terrestrial communication device. The satellite 235, which may include a computing device, is configured to communicate with a vehicle 210, with the communication network 230, with one or more communication devices 240, or with a combination thereof via one or more communication links 232/236. Although shown as a single unit here, a satellite may include any number of interconnected elements.

An electronic communication network 230 is any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 210 may identify a portion or condition of the vehicle transportation network 220. For example, the vehicle includes at least one on-vehicle sensor 209, like the sensor 136 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220.

The vehicle 210 may traverse a portion or portions of the vehicle transportation network 220 using information communicated via the electronic communication network 230, such as information representing the vehicle transportation network 220, information identified by one or more on-vehicle sensor 209, or a combination thereof.

Although FIG. 2 shows one vehicle transportation network 220, one electronic communication network 230, and one communication device 240, for simplicity, any number of networks or communication devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the electronic communication network 230, the vehicle 210 may communicate with the communication device 240 via any number of direct or indirect communication links. For example, the vehicle 210 may communicate with the communication device 240 via a direct communication link, such as a Bluetooth communication link.

Figure 3:
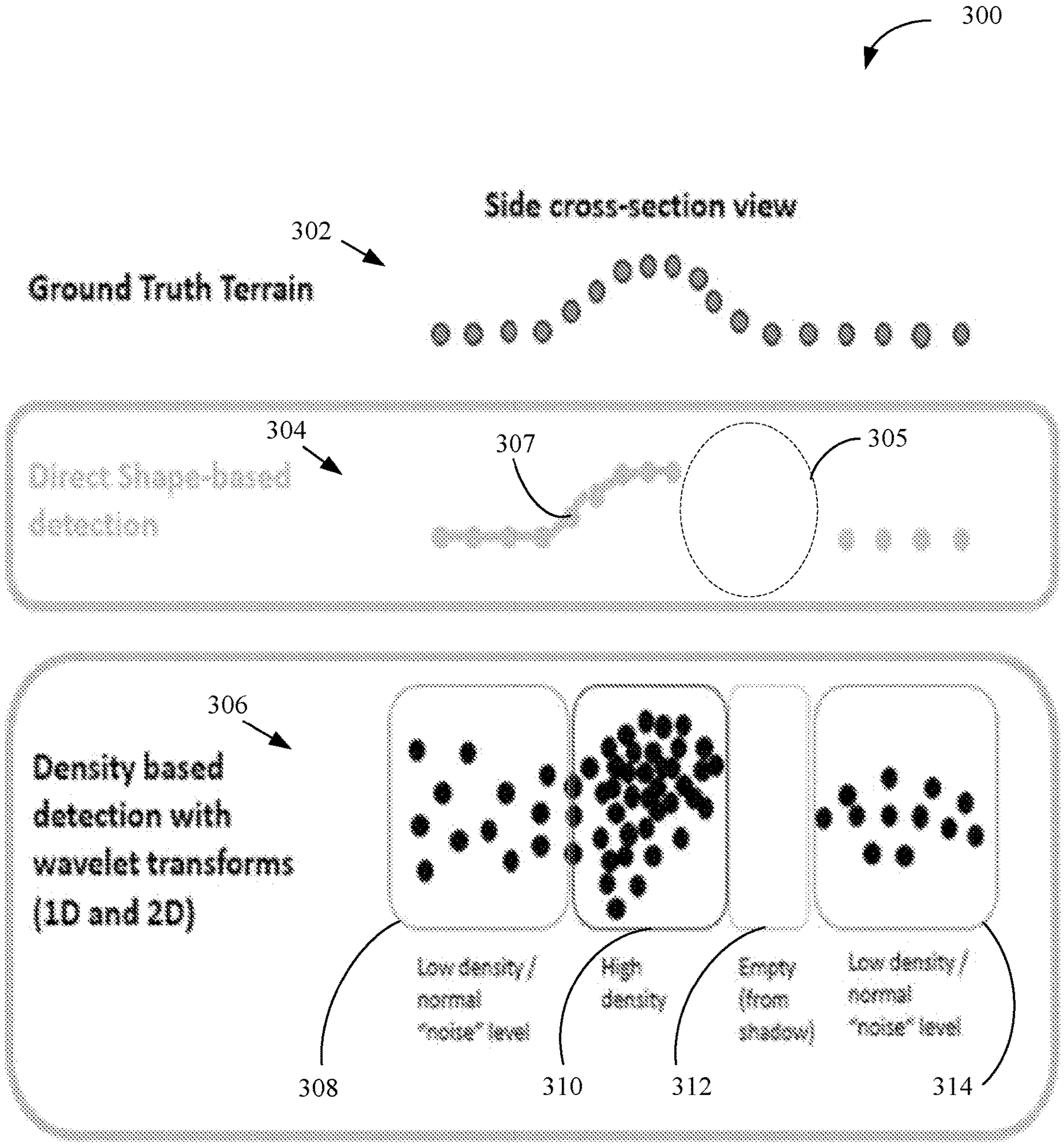
FIG. 3 depicts an example of difficulty of detecting speed bump based on the height of the speed bump and how density (e.g., density of sensor data) based detection may overcome such difficulty.

FIG. 3 depicts an example 300 of difficulty of detecting a speed bump based on a height of the speed bump and how density (e.g., density of sensor data) based detection may overcome such difficulty. The example 300 illustrates a cross-section view 302 of a speed bump and a cross-section view 304 of the speed bump as seen based on sensor data. The cross-section view 302 illustrates a profile of the speed bump were it possible for sensor (e.g., LiDAR) data to be obtained over all parts of the speed bump. That is, were it possible for LiDAR rays to hit every part of the speed bump and/or when the sensor data over the speed bump can be obtained with accuracy, then the cross-section view 302 would be possible. However, as LiDAR rays cannot hit the down-slopping side of the speed bump and/or the sensor data over all parts of the speed bump cannot be obtained with accuracy, the cross-section 304 would be observed. For example, even when multiple scans of point cloud data are accumulated to obtain the sensor data on a surface or ground, due to motion of a vehicle (e.g., rolling, pitching, yawing), accumulation of the multiple scans of point cloud data can often result in inaccuracies. For example, even small angular inaccuracies of the multiple scans of the point cloud data can result in inaccuracies that prevent from obtaining the sensor data that represent exact contours and surfaces of the speed bump. Therefore it is difficult to obtain an accurate sensor data over all parts of the speed bump, and consequently, it may result in obtaining sensor data as depicted in the cross-section view 304. Without extreme level of accuracy when accumulating the multiple scans of the point cloud data, a density of the sensor data may end up looking like a cross-section view of an example 306.

As such, a discrepancy between the cross-section view 302 and the cross-section view 304 for the speed bump is illustrated. To reiterate, the cross-section view 302 provides an example of how point cloud data should appear to accurately identify the speed bump based on a height of the speed bump; but the cross-section view 304 provides an example of actual point cloud data captured by a sensor of a vehicle while the vehicle is navigating a road with an upcoming speed bump ahead of the vehicle. While the cross-section view 302 illustrates continuous and uninterrupted pattern that can represent the speed bump, the cross-section view 304 includes a missing region of the point cloud data. The missing region corresponds to (or may be interpreted to be) a region of shadow 305. Beams of the sensor cannot hit or pass through the region of shadow 305. The region of shadow may correspond to a region that includes where speed bump protrusion starts to descend back to a road surface level and a road surface after the speed bump where beams of the sensor cannot reach.

Figure 4:
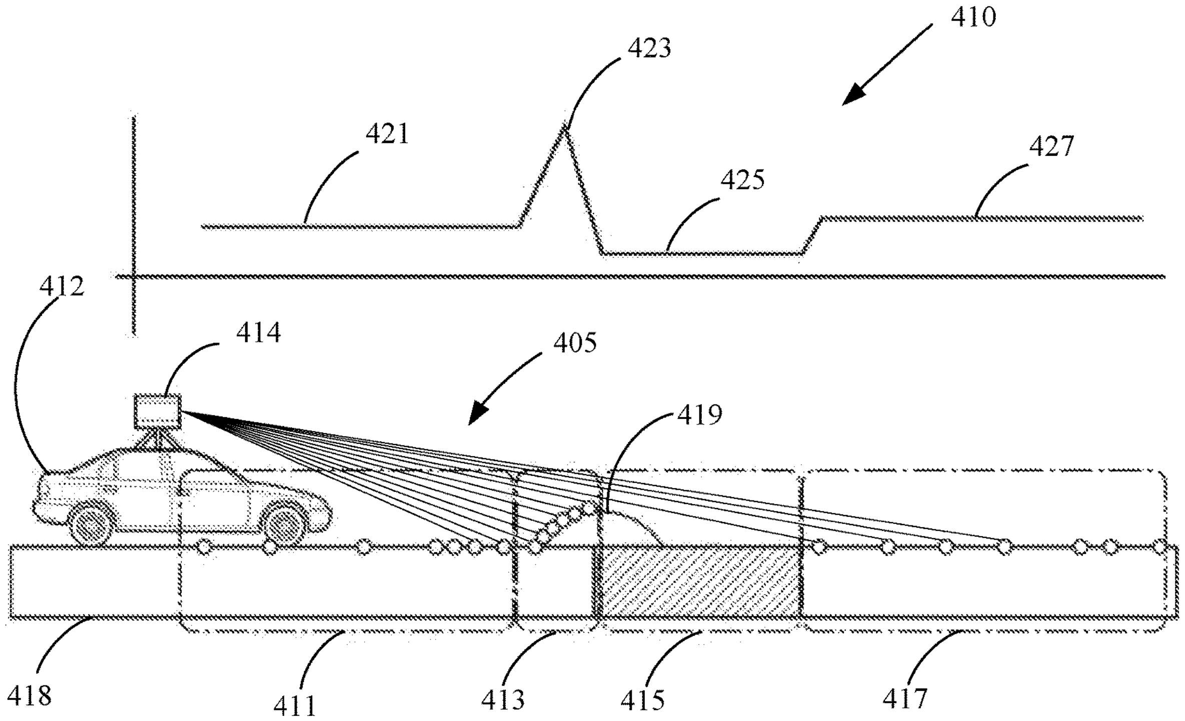
FIG. 4 depicts an example of a vehicle traversing on a road surface that includes a speed bump, and corresponding density plot and a density pattern of sensor data.

For example, as shown in FIG. 4, a presence of the protrusion of the speed bump (e.g., a speed bump 419) creates a shadow (area of zero density of the point cloud data). For example, such region of shadow 305 may correspond to a region of shadow or a third region 415 in FIG. 4. As such, due to the region of shadow 305 that causes an interruption or lack of portion of the point cloud data required to accurately identify the speed bump based on the height of the speed bump, the speed bump is still not distinguishable from the rest of the flat road just based on the height.

Accordingly, detecting the speed bump based on the height of the speed bump is difficult. Density-based detection can overcome such difficulty. The density-based detection can be used to detect the speed bump based on the density of point cloud data obtained from a sensor of the vehicle at different distances ahead of the vehicle. For example, the sensor of the vehicle may emit beams, where each of the beams may interact with different surfaces, ground, or ground object at different distances ahead of the vehicle. For example, the beams may be emitted from the sensor of the vehicle (e.g., a sensor 414 of a vehicle 412) as illustrated in FIG. 4, and each of the beams may interact or form a point of contact with different surfaces, the ground, or the ground object (e.g., speed bump).

The sensor data at different distances ahead of the vehicle may correspond to the sensor data at different regions of the road surface ahead of the vehicle, where the road surface includes the speed bump. For example, from a perspective of the sensor of the vehicle, each of different regions may correspond to a first region 308, a second region 310, a third region 312, and a fourth region 314. For example, from the perspective of the sensor of the vehicle, the first region 308 may correspond to a region of relatively flat road surface before the speed bump, the second region 310 may correspond to a region of beginning portion of the speed bump, where the relatively flat road surface transitions into the speed bump or rises to form the speed bump. For example, from the perspective of the sensor of the vehicle, the third region 312 may correspond to a region of ending portion of the speed bump, where a height of the speed bump declines in its height and where the beams of the sensor of the vehicle do not hit or pass through. Moreover, the third region 312 may correspond to the region of the shadow 305. For example, from the perspective of the sensor of the vehicle, the fourth region 314 may correspond to a region after the speed bump, where the speed bump transitions into the road surface that is relatively flat compared to the speed bump. For example, the regions may correspond to respective positions aligned with the cross-section view 302 and the cross-section view 304.

The first region 308, the second region 310, the third region 312, and the fourth region 314 may also correspond to a first region 411, a second region 413, a third region 415, and a fourth region 417 of FIG. 4.

The density of the point cloud data at these regions may exhibit a pattern as shown in the example 306 of the density of the point cloud data at different regions of the road surface that covers the speed bump.

For example, the first region 308 may have a normal (e.g., expected) density range compared to other three regions, the second region 310 may have high density range compared to other three regions, the third region 312 may have no density, and the fourth regions 314 may have a normal density range.

Moreover, as these density ranges represent relative measures (rather than definite ranges with defined boundaries) for specific areas of the spectrum under consideration (e.g., from a region right before the speed bump to a region after speed bump in FIG. 3), the pattern may be interpreted differently. For example, pattern of normal-high-zero-normal can take a form of low-high-zero-low. Such concept of relative measure may apply not only to the speed bump, but also to other road irregularities described in this disclosure.

As such, due to the region of shadow 305 created by the speed bump, which corresponds to the third region 312 where the beams of the sensor may not pass through and thus, has zero density, there is a consistent and detectable pattern in the density of the point cloud data. Moreover, such pattern remains even as the vehicle gets close to the speed bump. That is, a density of the point of contact or interaction point for beams of the sensor at different regions (e.g., the first region 308, the second region 310, the third region 312, the fourth region 314) remain similar even when vehicle moves closer to the speed bump and the sensor of the vehicle keeps emitting the beams. As the vehicle approaches the speed bump more and more rays of the LiDAR may reach the region of shadow 305. However, the density of the point cloud in that region will continue to not be as expected (e.g., will continue to be different from the density in, for examples, the first region 308 or the fourth region 314).

FIG. 4 depicts an example of a vehicle 412 traversing on a road surface 418 that includes a speed bump 419, and corresponding density plot 410 and a density pattern of sensor data. The vehicle 412 includes a sensor 414 mounted on top of the vehicle 412.

Moreover, FIG. 4 depicts an illustration 405 of points of contact or interaction formed by sensor beams of the sensor 414 at different distances ahead of the vehicle 412 and regions (a first region 411, a second region 413, a third region 415 (or a region of shadow), and a fourth region 417) on the road surface 418 that are used for determining a density pattern for the speed bump 419. For example, the sensor 414 may emit the beams, where each of the beams may interact with (e.g., bounce back off) different surfaces, ground, or ground object at different distances ahead of the vehicle 412. For example, as described above with respect to the region of shadow 305 in FIG. 3, there is a region of shadow (the third region 415 which has zero density of the point cloud data) created by the speed bump 419, and there is no point of contact for sensor beams at such region of shadow. As such, a region where there is no point of contact (e.g., where LiDAR rays don't reach) at all for the sensor beams may correspond to a region for the zero density (e.g., the region of shadow or the third region 415) of the point cloud data. As seen in the FIG. 4, even though the height change of the speed bump 419 may be gradual, the presence of this protrusion creates a shadow (area of zero density of the point cloud data). As described above, this shadow or density pattern remains as the vehicle 412 gets close to the speed bump 419. In addition, a beginning region of the speed bump 419, which corresponds to the second region 413, coincides with a higher density of points (e.g., point cloud data, point of contact of sensor beam) than density of points for other regions depicted in FIG. 4.

Moreover, as described above (e.g., in the example 306 of the density of the point cloud data at different regions in FIG. 3), the density of the point cloud data, which are captured at different distances ahead of the vehicle and cover an area of the speed bump 419, exhibit a pattern, which is also depicted in the density plot 410. The density plot 410 has density of the point cloud data on a y-axis and respective distance ahead of the vehicle on a x-axis. A position of a density curve of the density plot 410 is aligned with illustration of the point cloud data points within four regions (the first region 411, the second region 413, the third region 415, and the fourth region 417) ahead of the vehicle 412 or is aligned with the four regions to visualize such pattern.

For example, the pattern may be a normal-high-zero-normal, which corresponds to a density range that ascends from a normal density range 421 to a high density range 423, descends from the high density range 423 to a zero density 425 (e.g., substantially close to zero), and ascends from the zero density 425 to the normal density range 427, where a corresponding position for the zero density 425 includes a portion of the speed bump 419. In some implementations, the pattern may be a low-high-zero-low, which corresponds to a density range that ascends from a low density range to a high density range, descends from the high density range to a zero density, and ascends from the zero density to the low density range, where a corresponding position for the zero density includes a portion of the speed bump 419.

As such, due to the region of shadow (e.g., the third region 415) created by the speed bump 419, there is a consistent and detectable pattern in the density of the point cloud data.

Figure 5A:
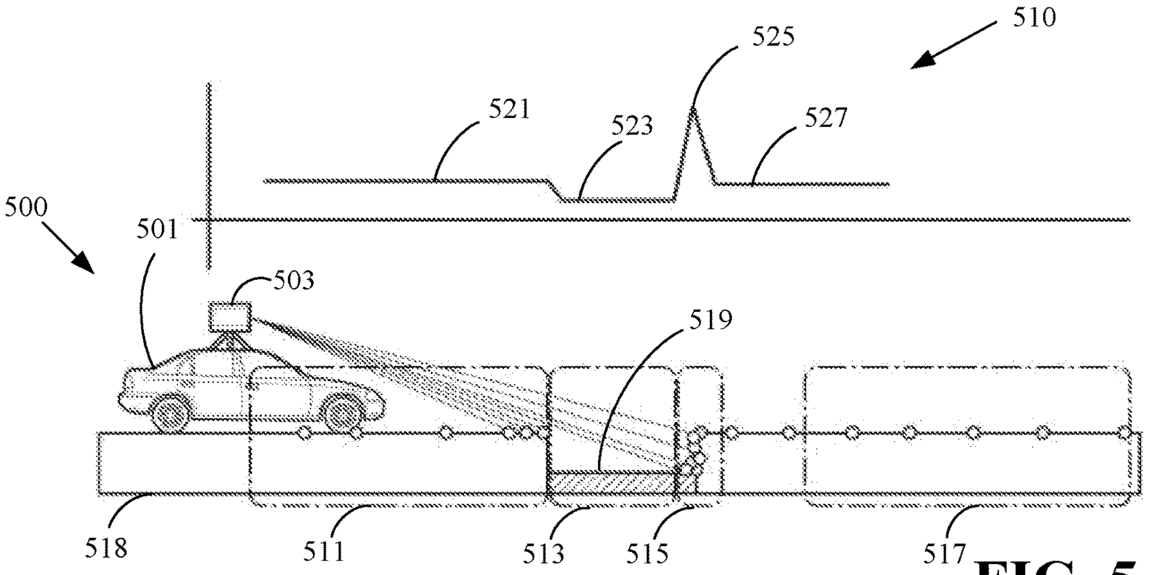
FIG. 5A depicts an example of a vehicle traversing on a road surface that includes a pothole, and corresponding density plot and a density pattern of sensor data.
Figure 5B:
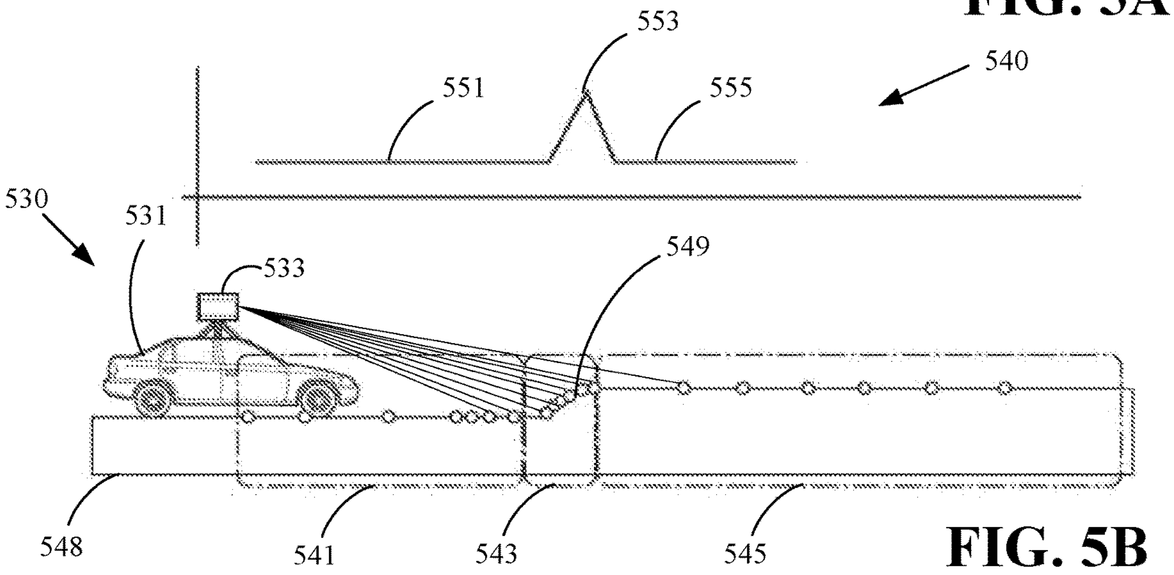
FIG. 5B depicts an example of a vehicle traversing on a road surface that includes a road elevation or a hill, and corresponding density plot and a density pattern of sensor data.
Figure 5C:
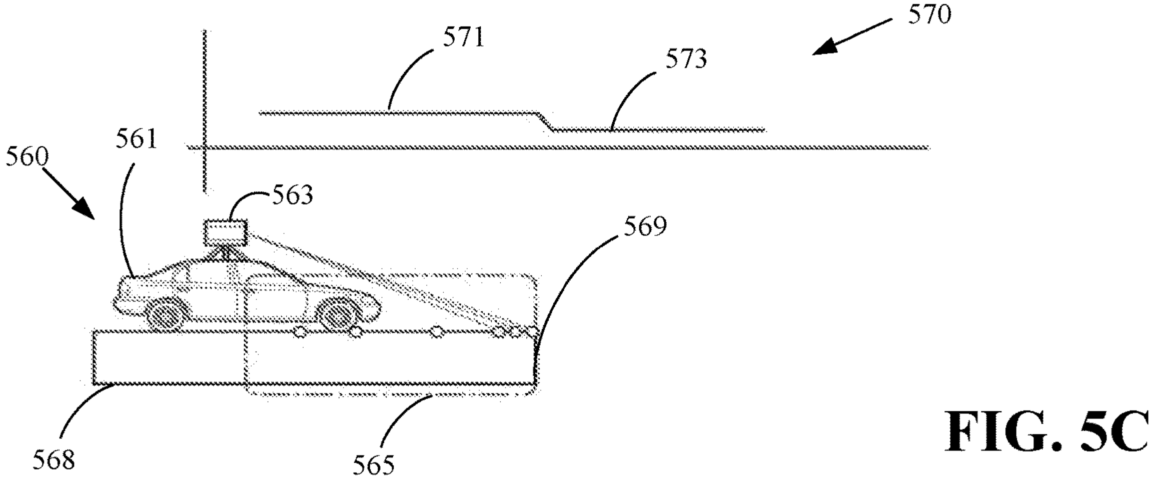
FIG. 5C depicts an example of a vehicle traversing on a road surface that includes a cliff, drop-offs, or a road descent, and corresponding density plot and a density pattern of sensor data.

Alternatively, different patterns of the density of the point cloud data can be used to detect road irregularities other than the speed bump. For example, different patterns of the density may be used to detect or distinguish pothole, cliff, and bump as depicted in FIGS. 5A-5C. In FIGS. 5A-5C, point cloud data may be obtained from a sensor of the vehicle at different distances ahead of the vehicle and a processor of the vehicle, such as the processor 133, may determine the density of the point cloud data and/or generate a density plot (e.g., the density plot 410 in FIG. 4) having density of the point cloud data on a y-axis and respective distance ahead of the vehicle on a x-axis.

FIG. 5A depicts an example 500 of a vehicle 501 traversing with a sensor 503 mounted on top of the vehicle 501 on a road surface 518 that includes a pothole 519, and corresponding density plot 510 having density of the point cloud data on a y-axis and respective distance ahead of the vehicle on a x-axis. For example, the pothole 519 can be detected (e.g., identified) by determining that the density of the point cloud data exhibits a pattern where a density curve of the density plot 510 descends from a normal density range 521 to a zero density 523, ascends from the zero density 523 to a high density range 525, and descends from the high density range 525 to the normal density range 527. In such pattern, a corresponding position for the zero density 523 can include a portion of the pothole 519. Moreover, the density pattern of normal-zero-high-normal may correspond to positions or regions (e.g., regions such as a first region 511, a second region 513, a third region 515, and a fourth region 517) described in FIG. 5A.

FIG. 5B depicts an example 530 of a vehicle 531 traversing with a sensor 533 mounted on top of the vehicle 531 on a road surface 548 that includes a road elevation or a hill 549, and corresponding density plot 540. For example, the road elevation or the hill 549 can be identified by determining that the density data exhibit a pattern where a density curve of the density plot 540 ascends from a normal density range 551 to a high density range 553, and descends from the high density range 553 to the normal density range 555. In such pattern, a corresponding position for the high density range 553 can include a portion of the road elevation or the hill 549. Moreover, the density pattern of normal-high-normal may correspond to regions (e.g., regions such as a first region 541, a second region 543, and a third region 545) described in FIG. 5B.

FIG. 5C depicts an example 560 of a vehicle 561 traversing with a sensor 563 mounted on top of the vehicle 561 on a road surface 568 that includes a cliff, drop-off, or a road descent 569, and corresponding density plot 570. For example, the cliff, drop-off, or the road descent 569 can be identified by determining that the density data exhibit a pattern where a density curve of the density plot 570 descends from a normal density range 571 to a zero density 573. In such pattern, a corresponding position for where the density curve changes from the normal density range 571 to the zero density 573 can include a portion of the cliff, the drop-off, or the road descent 569. Moreover, the density pattern of normal-zero may correspond to regions (e.g., a first region 565, and a region that discontinues after the first region 565) described in FIG. 5C.

Figure 6A:
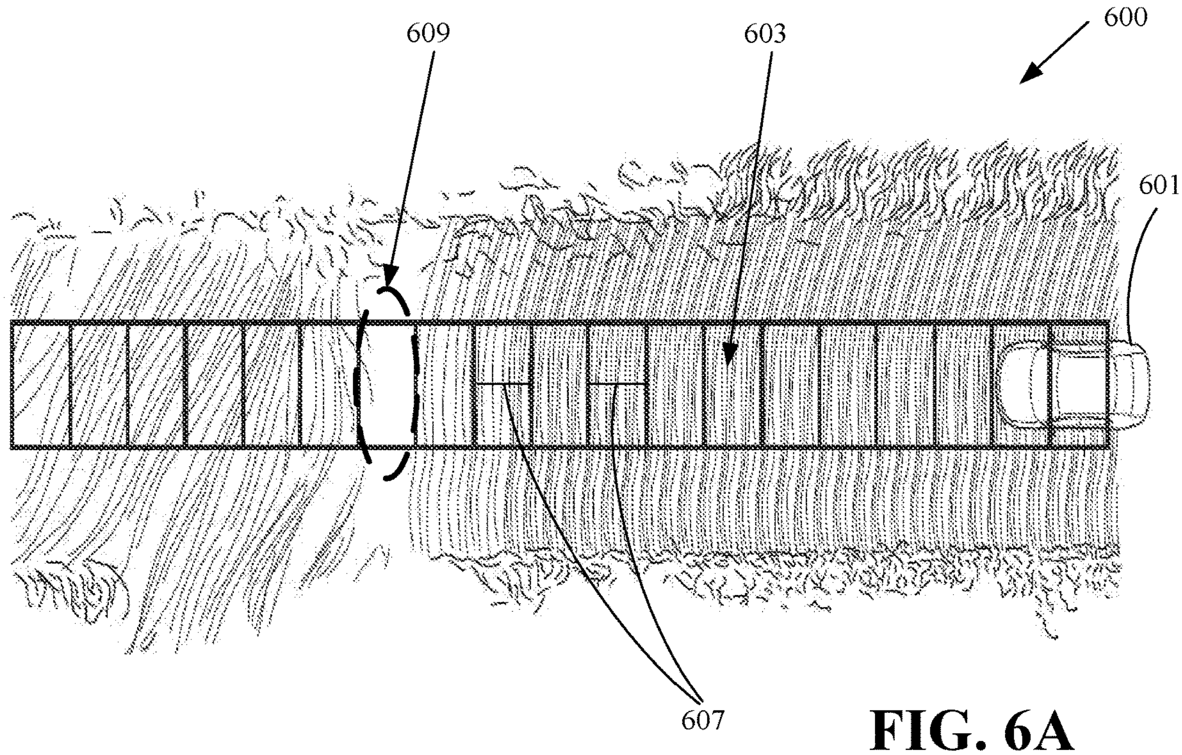
FIG. 6A depicts an example illustration of accumulated sensor data (e.g., accumulated point cloud data) and multiple one-dimensional distance bins that are used for determining a density of point cloud data obtained from a sensor of a vehicle.
Figure 6B:
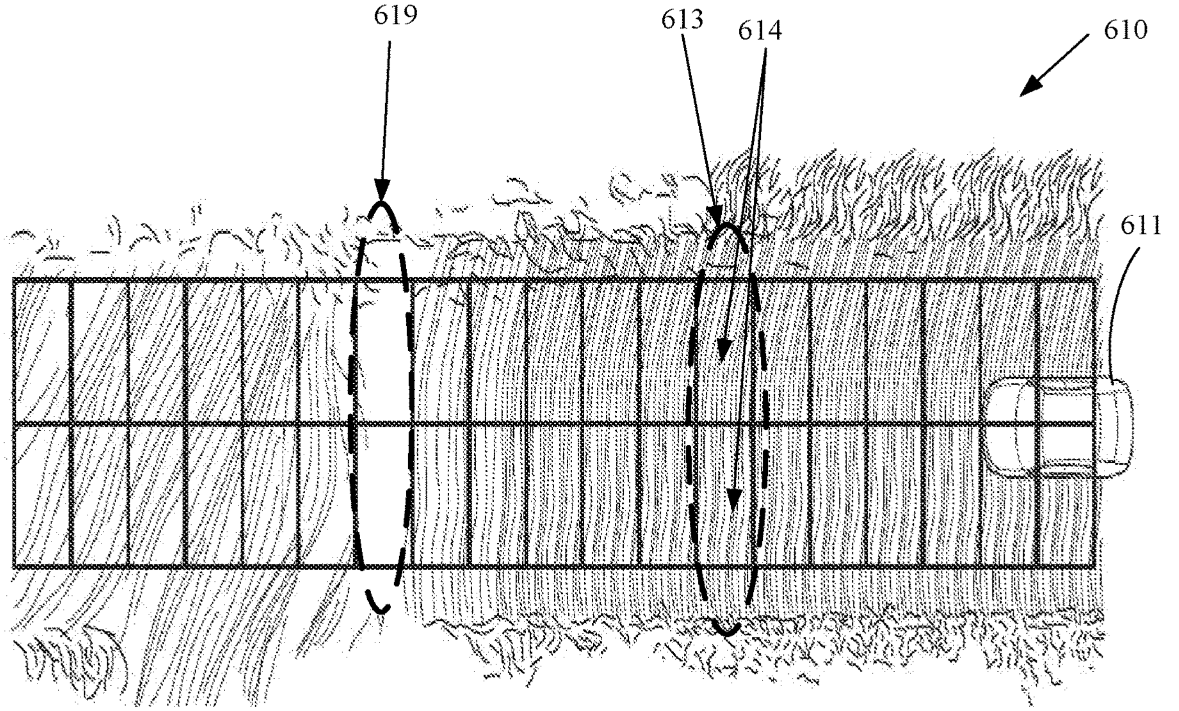
FIG. 6B depicts an example illustration of accumulated sensor data (e.g., accumulated point cloud data) and multiple two-dimensional distance bins that are used for determining a density of point cloud data obtained from a sensor of a vehicle.

FIGS. 6A-6B depicts example illustrations 600 and 610 of accumulated sensor data (e.g., accumulated point cloud data), and multiple one-dimensional (1D) distance bins and two-dimensional (2D) distance bins that are used for determining a density of point cloud data obtained from a sensor (such as the sensor 136) of a vehicle 601 and 611. More specifically, the point cloud data can be binned into multiple distance bins, where each of the multiple distance bins corresponds to or is represented by a defined distance interval (e.g., distance interval 607) within a threshold distance ahead of the vehicle 601 and 611. That the point cloud data is binned into multiple distance bins includes dividing the space (e.g., road) ahead of the vehicle into segments and determining (e.g., identifying, calculating, etc.) a density of the point cloud data in each segment (i.e., bin) over time.

The illustration 600 includes multiple one-dimensional (1D) distance bins (represented by rectangular boxes extending in a horizontal direction), and the illustration 610 includes multiple two-dimensional (2D) distance bins (represented by two rectangular boxes in vertical direction, extending to multiple boxes in a horizontal direction). An example of a 1D distance bin (e.g., 1D bin) may be a 1D bin 603. An example of a 2D distance bin (e.g., 2D bin) may be a 2D bin 613 having sub-bins 614.

Even though the 1D bins are depicted as rectangular boxes, the 1D bins may be a single line partitioned into multiple distance intervals or take form of any shape. Even though the 2D bins are depicted as two rectangular boxes in a vertical direction, where the two rectangular boxes extend out to multiple boxes in the horizontal direction, the 2D bins may be more than two boxes and be of any other shape.

Moreover, the example illustrations 600 and 610 depict circled portions 609 and 619 which may correspond to regions where a portion of speed bump is located. For example, region of the circled portions 610 and 620 may correspond to a region of shadow casted by the speed bump, where beams of the sensor do not pass through. For example, the region of shadow may correspond, from a perspective of the vehicle 601 and 611, to a region that includes where speed bump protrusion starts to descend back to a road surface level and a road surface after the speed bump where beams of the sensor do not pass through. For example, the regions of the circled portion 609 and 619 may correspond to the region of shadow 305 of FIG. 3 or the third region 415 of FIG. 4.

In some implementations, prior to binning the point cloud data into multiple distance bins, a ground segmentation may be applied to sensor data (e.g., point cloud data, LiDAR image) obtained from the sensor of the vehicle. For example, ground points (e.g., ground data points) are detected (or separated) from non-ground points (e.g., non-ground data points). Moreover, implementations described in U.S. patent application Ser. No. 17/683,166 and titled, "Vehicle Drivable Area Detection System", can be additionally used or supplanted in applying ground segmentation techniques, which is incorporated herein in its entirety by reference.

For example, the sensor mounted on a vehicle (e.g., the vehicle 601, 611) may collect sensor data (e.g., point cloud data) and assemble the sensor data, creating a 2D depiction of the surrounding features and ground.

Moreover, for example, assembled sensor data may be processed by the controller such that data points that represent vertical obstacles, where groups of data points are accumulated or stacked on top of another, can be extracted. For example, the vertical obstacles may be obstacles on the sides of vehicles, sides of buildings, side of barriers, side of a box on the road, etc. Such vertical obstacles may represent obstacles that are impassable or not traversable by the vehicle.

Moreover, the assembled sensor data may be processed by the controller such that non-vertical data points are extracted and designated as possible ground features, ground candidates, and/or non-ground features.

Moreover, the assembled sensor data may be processed such that terrain near the vehicle may be estimated. For example, ground data points located beneath the vehicle are assumed by the controller to be actual ground points, since the vehicle is in contact with the ground beneath itself. Further, the assembled sensor data may be processed such that the actual overall shape and contour of the terrain near the vehicle can be estimated.

Moreover, after ground segmentation is applied such that the ground points are separated from the non-ground points, the assembled sensor data may be processed by the controller such that curb points can be estimated, lane or road markings can be detected, and/or portions of data points that are above a predetermined height relative to the vehicle and the estimate of the terrain can be filtered. Such processed sensor data (e.g., assembled sensor data) can be used to form a digital rendering of the areas around the vehicle. Such processed sensor data (e.g., assembled sensor data) or the digital rendering of the areas can be used to evaluate and/or extract drivable area boundary. Such extracted drivable area boundary may be a representation of a free space around the vehicle, where the vehicle can move to. In an example, techniques described in the U.S. patent application Ser. No. 17/683,166 can be used to generate such drivable area boundary. In some implementations, after a road irregularity is identified in accordance with a technique 900 of FIG. 9, a technique 1000 of FIG. 10, and/or other embodiments of this disclosure, the road irregularity may be incorporated into the drivable area boundary.

After the ground segmentation is applied to the sensor data, the sensor data may be binned into the multiple distance bins such as the distance bins depicted in FIGS. 6A and 6B.

Point cloud data (e.g., sensor data), or ground points of the sensor data may be accumulated (e.g., to form accumulated point cloud data) before, as part of, or after the ground segmentation, by simply buffering point cloud data from prior frames and transforming them to a current vehicle frame, using pose estimate at each point cloud scan.

In some implementations, the sensor data may be binned into the multiple distance bins depicted in FIGS. 6A and 6B without applying the ground segmentation. For example, the point cloud data can be buffered from prior frames and transformed into the current vehicle frame, and as such, point cloud data can be accumulated (e.g., to form accumulated point cloud data), and binned without applying the ground segmentation or after minimally processing the sensor data.

In some implementations, a number of identified points of the point cloud data at a time step t is added to the accumulated total identified points in the previous time steps up to time step t−1 (e.g., to form accumulated point cloud data). So, at the time step t, LiDAR rays are sent out to each of the bins (e.g., road segments) from which we identified the points for the time step.

In some implementations, the sensor data may be accumulated and binned into 1D distance bins. For example, the processor of the vehicle may execute instructions to determine each 1D bin to have certain pre-determined distance (e.g., 10 cm) within a pre-determined threshold distance (e.g., 50 m) ahead of the vehicle (e.g., in a direction parallel to the vehicle's x-axis). For example, the pre-determined threshold distance may be distance starting from the center of the vehicle and extending forward to or ahead of the vehicle. As the vehicle is traversing the road, the processor of the vehicle may analyze the sensor data collected in real-time to apply ground segmentation, and bin the sensor data (e.g., point cloud data) into multiple (e.g., 10 cm) distance bins. Then the processor of the vehicle may determine or identify density of the sensor data contained in each distance bin for one or more of the multiple distance bins such that a density pattern with respect to distance bins or distances ahead of the vehicle can be determined. Accordingly, if the pattern matches the described or pre-determined density patterns of the road irregularity such as the speed bump, then the road irregularity can be determined.

Moreover, in some implementations, determining whether the density pattern matches the described or pre-determined density patterns of the road irregularity may include binning the expected ground points (estimated or predicted ground points) into the multiple distance bins, and comparing the actual patterns (that are derived from actual ground points in the multiple distance bins) to expected patterns (that are derived from expected ground points in the multiple distance bins). For example, the expected ground points may be based on known scan line angles (e.g., sensor beam angles) of the sensor and the rough terrain estimate determined. For example, the expected ground points may be generated for every frames of point cloud data based on each of frame's ground segmentation and subsequent terrain estimate results, along with the known scan line angles. For example, given the expected terrain height and the known scan line angles, expected location of all the grounds points can be derived, and as such, expected sensor data representing the expected ground points can be derived (or the expected sensor data may correspond to the expected ground points). Accordingly, thereafter, the expected ground points can be binned into the multiple distance bins and expected density of the sensor data can be determined. Moreover, expected density plot (e.g., an expected density curve 804) can be determined and/or generated based on the expected density of the sensor data.

For the ground segmentation step in generating or obtaining actual ground points and/or expected ground points, any known ground segmentation techniques may be used. Ground segmentation can be used to separate ground points from non-ground points. The ground segmentation can be used to remove ground points from further processing of point cloud data. In an example, techniques described in the U.S. patent application Ser. No. 17/683,166 can be used.

In an example, the expected ground points may correspond to an estimate of terrain generated by an electronic controller (such as the controller 130) or the processor 133 of the controller 130. For example, the controller 130 or the processor 133 may evaluate a group of data points extracted from the point cloud data, and estimate overall shape and contour of the terrain.

Figure 8A:
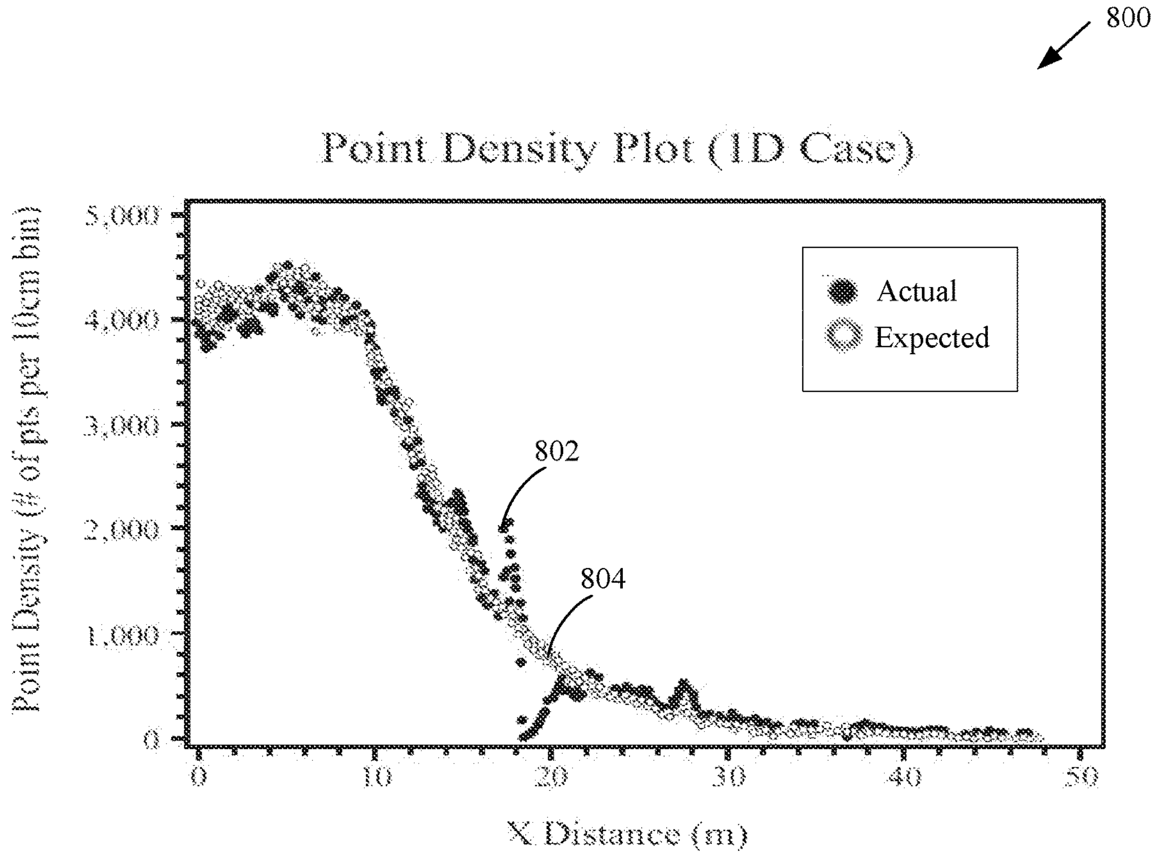
FIG. 8A is an example density plot which depicts comparison of actual density curve that is derived from actual ground points to expected density curve that is derived from expected ground points as described above.

For example, comparing the actual patterns to the expected patterns may correspond to taking a difference between expected density of sensor data to the actual density of the sensor data. By doing so (e.g., comparing the actual patterns to the expected patterns, taking the difference between the expected density and the actual density), anomaly can be distinguished between the expected density and the actual density. For example, actual density curve (e.g., an actual density curve 802) representing the actual density with respect to distances ahead of the vehicle or the actual density of the distance bins may be determined and compared to an expected density curve (e.g., the expected density curve 804), as depicted in FIG. 8A, and the anomaly can be distinguished accordingly.

As one example that describes steps from obtaining sensor data and comparing the actual patterns to the expected patterns of the sensor data, following description can be used. For every new frame of point cloud data, ground segmentation technique can be applied to accumulate new point cloud data or new ground points to buffer, and generate and accumulate the expected ground points. Thereafter, accumulated point cloud data (e.g., sensor data) and accumulated expected ground point data can be binned into multiple distance bins, density of sensor data and density of expected density of the sensor data can be determined, density plots including the actual density curve and the expected density curve can be generated, and the actual patterns of sensor data can be compared to the expected patterns of the expected density of the sensor data.

In some implementations, multiple distance bins may be 2D bins as shown in FIG. 6B, where actual ground points may be accumulated and binned in a similar manner as done in one-dimensional (ID) multiple distance bins. In a context of the 2D bins, instead of having a bin that spans the width of the road (like in FIG. 6A), the bin that spans the width of the road can be further partitioned into sub-bins. For example, the ID bin 607 may be further partitioned into the sub-bins 614 depicted in the 2D bin 613 in FIG. 6B to form the 2D bin. For example, the processor of the vehicle may execute instructions to determine each 2D bin to have certain pre-determined dimension (e.g., 10 cm×10 cm (e.g., each of the bins are identical)) within a pre-determined threshold distance (e.g., 50 m) ahead of the vehicle (e.g., direction parallel to the vehicle's x-axis). For example, the pre-determined threshold distance may be distance starting from the center of the vehicle and extending forward to (or ahead) of the vehicle. As the vehicle is traversing the road, the processor of the vehicle may analyze the sensor data collected in real-time to apply ground segmentation, accumulate the sensor data, and bin the sensor data (e.g., point cloud data) into multiple 10 cm×10 cm distance bins. Then the processor of the vehicle may determine or identify the density of the sensor data contained in each distance bin for one or more of the multiple distance bins such that a density pattern (such as the patterns of road irregularities described above) can be determined. For example, a value for the respective density of the sensor data in each 2D distance bin may be computed based on respective number of pixels.

Accordingly, if the pattern matches the described or pre-determined density patterns of the road irregularity, then the road irregularity can be determined.

Figure 7:
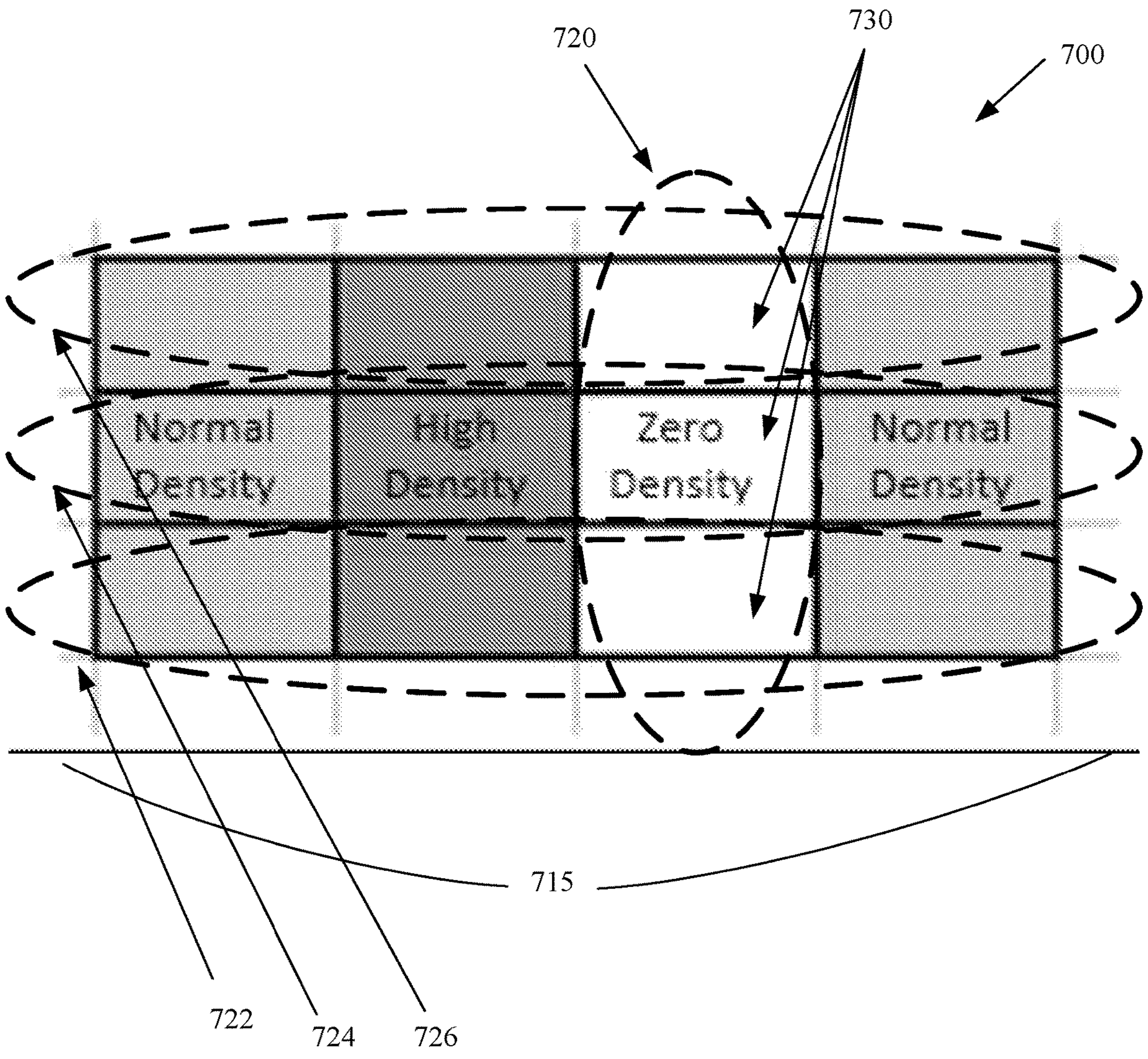
FIG. 7 depicts an example illustration where a road segment is divided into multiple sub-bins for each two-dimensional distance bin, which can be used to generate a two-dimensional density plot.

FIG. 7 depicts an example illustration 700 where a road segment 715 is divided into multiple sub-bins for each 2D bin. For example, the road segment 715 may be partitioned into multiple 2D bins (e.g., a 2D bin 720 having three sub-bins 730), and a 2D density plot can be generated based on the multiple 2D bins. For example, the 2D density plot or multiple plots can be generated, where each plot corresponds to sub-bins contained in each row (e.g., a row 1 722, a row 2 724, a row 3 726). For example, one plot can be generated corresponding to a top row (the row 3 726), another plot can be generated corresponding to a middle row (the row 2 724), and another plot can be generated corresponding to a bottom row (the row 1 722).

Generation of multiple plots or the 2D density plot can be helpful because, for example, such generation may enable a vehicle (e.g., the vehicle 100) to make better decisions. For example, a pothole may be identified only in the middle row (the row 2 724) of the road segment 715. In such scenario, the vehicle can be controlled to traverse around the pothole to the right side or left side (either by the row 3 726 or the row 1 722) because no irregularities were determined to exist on the right side or the left side.

Figure 8B:
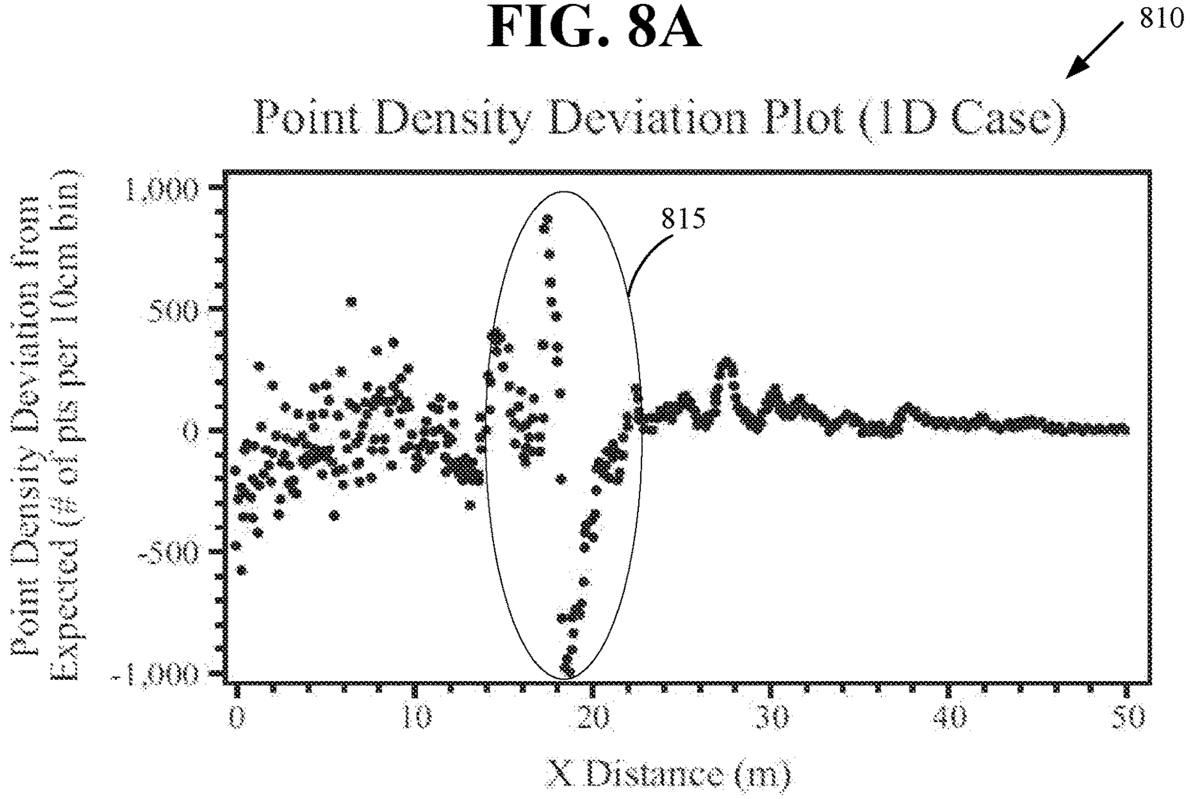
FIG. 8B is an example density plot which depicts a difference or deviation between the expected density curve and the actual density curve with respect to distances ahead of the vehicle.

FIG. 8A is an example density plot 800 which depicts a comparison of actual density curve 802 (that is derived from actual ground points) to expected density curve 804 (that is derived from expected ground points as described above). For example, the expected ground points may be based on known scan line angles of the sensor (e.g., LiDAR sensor) and the rough terrain estimate determined as part of the ground segmentation step described above. For example, comparing the actual density curve 802 to the expected density curve 804 may correspond to taking a difference between the actual density curve 802 (or data points of the actual density curve 802) and the expected density curve 804 (or data points of the expected density curve 804). By doing so (e.g., comparing the actual density curve 802 or actual density patterns to the expected density curve 804 or expected density patterns, taking the difference between the expected density curve 804 and the actual density curve 802), anomalies can be identified between the expected density curve 804 and the actual density curve 802. Such differences are depicted in FIG. 8B, where the difference between the expected density curve 804 and the actual density curve 802 in a density plot 810 is shown. The differences (e.g., point density deviation) are represented as point density deviation on a y-axis, and respective distance ahead of the vehicle is represented on a x-axis. In this density plot 810 of FIG. 8B, circled portion 815 represents noticeably high difference or high density deviation between 15m and 22 m, compared to other standard deviations at different distances ahead of vehicle. Such circled portion 815 of the high density deviation may correspond to a portion of the road irregularity. For example, responsive to determining that the density deviation exceeds a pre-determined threshold (e.g., 700 points per 10 cm bin), the processor may determine that corresponding distances (to density deviation that exceed the pre-determined threshold) include the portion of the road irregularity.

In some implementations, wavelet transforms (e.g., wavelet transform function) can be applied to such density data (e.g., density curve, density data points) corresponding to the point cloud data to identify and analyze density data patterns that may represent the road irregularities. For example, the processor may execute instructions to apply wavelet transforms to the density data to decompose the density data into different frequency components, which may enable analysis of many different features including detection of such density pattern. For example, such density pattern corresponding to the road irregularity may be detected (e.g., identified) through the wavelet transforms, and accordingly, an existence of the road irregularity may be determined. For example, wavelet transforms may be applied to both the actual density of the sensor data and the expected density, respectively, to detect or determine the actual patterns corresponding to the road irregularity and the expected patterns. Once the actual patterns and the expected patterns are detected or determined, they can be compared with each other to help determine an existence of the anomaly between the actual patterns and the expected patterns.

In some implementations, pattern matching technique other than wavelet transforms may be used to detect such pattern. For example, such density pattern corresponding to the road irregularity may be detected through a simple convolution with a kernel function, and accordingly, an existence of the road irregularity may be determined. For example, the processor may execute instructions to apply a simple convolution with a kernel function to the density data to detect the presence of such pattern. For example, kernel may be a small matrix or array that defines the pre-determined or pre-configured or pre-programmed pattern that corresponds to different types of road irregularities, and the density data may be convolved with the kernel to detect patterns in the density data. For example, when there is a presence of the pattern that matches one of the road irregularities such as speed bump, then the existence of road irregularity may be identified accordingly. For example, the simple convolution with the kernel function may be applied to both the actual density of the sensor data and the expected density of the sensor data to detect the actual patterns corresponding to the road irregularity and the expected patterns, and actual patterns may be compared to the expected patterns to help determine an existence of the anomaly between the actual patterns and the expected patterns.

Figure 9:
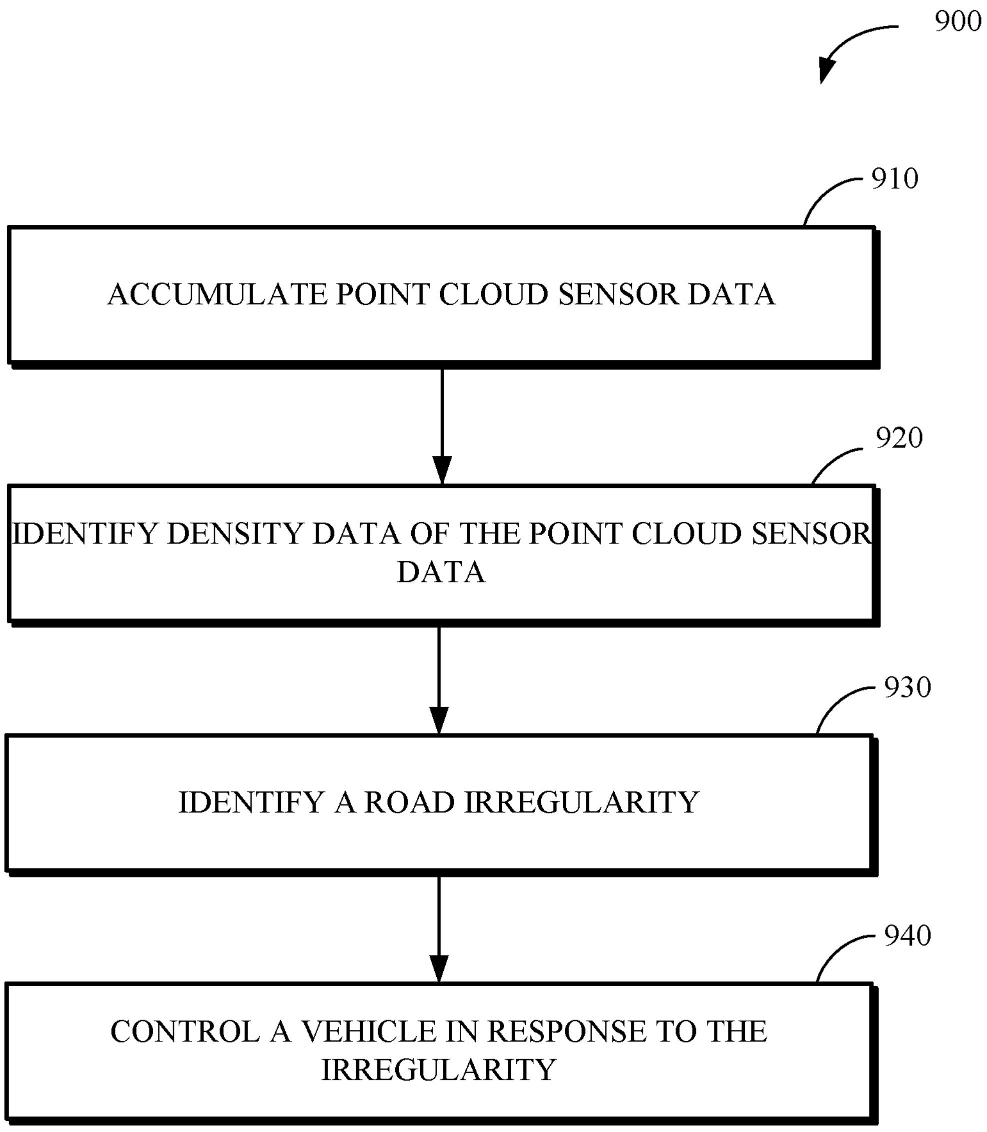
FIG. 9 is a flowchart diagram of an example of a technique for identifying a road irregularity in accordance with embodiments of this disclosure.

FIG. 9 is a flowchart diagram of an example of a technique 900 for identifying a road irregularity in accordance with embodiments of this disclosure. The technique 900 can be implemented by using a processor of a vehicle (such as the processor 133), a controller (such as the controller 130), and/or a sensor (e.g., the sensor 136, the on-vehicle sensor 209, or any of the sensors depicted in FIGS. 4 and 5A-5C) of or connected to the vehicle. Moreover, the technique 900 can be implemented using the vehicle 100 of FIG. 1, vehicle transportation and communication system 200 of FIG. 2, any system, components, graphs, and implementations depicted and described with respect to FIG. 3-8B.

At 910, point cloud data obtained from the sensor is accumulated. For example, point cloud data obtained at different distances ahead of the vehicle may be accumulated. For example, accumulating the point cloud data is done by buffering point clouds from prior frames and transforming them to the current car frame, using the pose estimate at each point cloud scan. For example, accumulating the point cloud data is done by continually updating the point cloud data at different distances ahead of the vehicle, and as new points are gathered, they are added to the point cloud data and as the vehicle moves, old points that are no longer relevant (such as points behind the vehicle) are discarded.

In some implementations, prior to, as part of, or after accumulating the point cloud data, ground segmentation may be applied to the point cloud data. For example, the ground segmentation may be applied to sensor data (e.g., point cloud data, LiDAR image) obtained from the sensor of the vehicle such that ground points (e.g., ground data points) are detected (or separated) from non-ground points (e.g., non-ground data points).

At 920, density data of the point cloud data is identified. In some implementations, the processor may process the point cloud data and identify (e.g., determine, compute) density of the point cloud data at different distances ahead of the vehicle. For example, identifying the density data of the point cloud data at the different distances ahead of the vehicle can include binning the point cloud data into multiple distance bins and determining density data of each distance bin. For example, the multiple distances may be 1D distance bins or 2D distance bins. For example, each of the 1D distance bins may correspond to a defined distance interval within a threshold distance ahead of the vehicle. For example, each of the 2D distance bin may have two dimensions, where one dimension corresponds to the defined distance interval within a threshold distance ahead of the vehicle, and other dimension corresponds to a defined distance or width. For example, 2D distance bins may correspond to two or more bins that cover the other dimension which corresponds to the width that is perpendicular to the threshold distance ahead of the vehicle.

In some implementations, in addition to identifying actual density data of the point cloud data, expected density of expected point cloud data may be identified, as described herein. For example, the expected ground points may correspond to an estimate of terrain generated by an electronic controller (such as the controller 130) or the processor 133 of the controller 130. For example, the controller 130 or the processor 133 may evaluate a group of data points extracted from the point cloud data, and estimate overall shape and contour of the terrain, as described above.

In some implementations, identifying the density data of the point cloud data at the different distances ahead of the vehicle can include binning the actual point cloud data and the expected point cloud data into multiple distance bins, and determining the actual density data and the expected density data in each distance bin for comparison in determining whether anomaly or discrepancy exists between the actual density data and the expected density data. Such anomaly or discrepancy can be used to determine or identify or aid in determining or identifying the road irregularity. For example, then density plot can correspond to a 1D density plot (such as the density plot 410 depicted in FIG. 4).

Moreover, in some implementations, density plot can be plotted. For example, the density plot can correspond to a 1D density plot (such as the density plot 410 in FIG. 4), or a 2D density plot, or one of any other density plots that are described or depicted in accordance with embodiments of this disclosure.

At 930, the road irregularity is identified. For example, a pattern of the density data can be determined by using a wavelet transforms or other pattern matching method (e.g., kernel function) for road irregularity detection.

In some implementations, wavelet transforms can be applied to such density data corresponding to the point cloud data to identify and analyze such pattern. For example, a processor of a vehicle, such as the processor 133, may execute instructions to apply wavelet transforms to the density data to decompose the density data into different frequency components or a series of wavelet coefficients at multiple scales, extract pattern that corresponds to the road irregularity, and/or other features of the data based on the pattern (e.g., geometric shape of road irregularity, identification of road irregularity). For example, when there is a presence of the pattern that matches one of the road irregularities such as speed bump, then the existence of road irregularity may be identified accordingly.

In some implementations, pattern matching technique other than wavelet transforms may be used to detect such pattern. For example, the processor may execute instructions to apply a simple convolution with a kernel function to the density data to detect the presence of such pattern. For example, kernel may be a small matrix or array that defines the pre-determined or pre-configured or pre-programmed pattern that corresponds to different types of road irregularities, and the density data may be convolved with the kernel to detect patterns in the density data. For example, when there is a presence of the pattern that matches one of the road irregularities such as speed bump, then the existence of road irregularity may be identified accordingly.

The pattern that corresponds to the road irregularity may be any of the patterns described and depicted in FIGS. 3, 4, 5A-5C, 7, and 8A-8B.

For example, identifying the road irregularity based on the density data can be identifying that the road irregularity corresponds to a speed bump in response to determining that the density data exhibit a pattern where the density data (e.g., density curve in the density plot or in the density pattern) ascends from a normal density range to a high density range, descends from the high density range to a zero density, and ascends from the zero density to the normal density range, where a corresponding position (e.g., region) for the zero density includes a portion of the speed bump. In other words, the pattern is described as being normal-high-zero-normal. The position (or distance ahead of the vehicle) for the normal-high-zero-normal may correspond to normal (right before the speed bump)-high (at the beginning portion of the speed bump elevation)-zero (at the ending portion of the speed bump, which is a region of shadow as described above with respect to FIG. 3, where beams of the sensor of the vehicle do not pass through)-normal (after the speed bump or behind the speed bump). For example, the position for the normal-high-zero-normal may correspond to, for example, the first region 411, the second region 413, the third region 415, the fourth region 417 of FIG. 4. In some implementations, such pattern for the detection of the speed bump can also take a form of low-high-zero-low.

Moreover, as these density ranges represent relative measures (rather than definite ranges with defined boundaries) for specific areas of the spectrum under consideration (e.g., from a region right before the speed bump to a region after speed bump as depicted in FIG. 3 or FIG. 4), the pattern may be interpreted differently. For example, pattern of normal-high-zero-normal can take a form of low-high-zero-low. Such concept of relative measure may apply not only to the speed bump, but also to other road irregularities described in this disclosure.

For example, identifying the road irregularity based on the density data can be identifying that the road irregularity corresponds to a pothole in response to determining that the density data exhibit a pattern where the density data (e.g., density curve in the density plot or in the density pattern) descends from a normal density range to a zero density, ascends from the zero density to a high density range, and descends from the high density range to the normal density range, and that a corresponding position for the zero density includes a portion of the pothole. For example, the density pattern of normal-zero-high-normal may correspond to regions (e.g., regions such as the first region 511, the second region 513, the third region 515, and the fourth region 517) described in FIG. 5A.

For example, identifying the road irregularity based on the density data can be identifying that the road irregularity corresponds to a road elevation or a hill in response to determining that the density data exhibit a pattern where the density data (e.g., density curve in the density plot or in the density pattern) ascends from a normal density range to a high density range, and descends from the high density range to the normal density range, and that a corresponding position for the high density range includes a portion of the road elevation or the hill. For example, the density pattern of normal-high-normal may correspond to regions (e.g., regions such as the first region 541, the second region 543, and the third region 545) described in FIG. 5B.

For example, identifying the road irregularity based on the density data can be identifying that the road irregularity corresponds to a cliff, drop-off, or a road descent in response to determining that the density data exhibit a pattern where the density data (e.g., density curve in the density plot or in the density pattern) descends from a normal density range to a zero density, and that a corresponding position for the zero density or a position where the density data changes from the normal density range to the zero density includes a portion of the cliff, the drop-off, or the road descent. For example, the density pattern of normal-zero may correspond to regions (e.g., the first region 565, and the region that discontinues after the first region 565) described in FIG. 5C.

In some implementations, when the actual density data and the expected density data (derived from the expected ground points) are determined, difference between the actual density data and the expected density data can be measured or determined to further confirm or aid in determining an existence of the road irregularity. For example, an anomaly between the actual density data and the expected density data can be determined by measuring or determining the differences between them. For example, actual density curve and expected density curve can be compared with other determine such difference. For example, wavelet transforms or pattern matching technique (e.g., simple convolution with the kernel function) may be used to detect presence of patterns representing the density data deviation and/or the anomaly between the actual density and the expected density.

In some implementations, such anomaly can be used prior to determining whether the road irregularity exists based on the corresponding density patterns for the road irregularity. For example, responsive to determining that there is such anomaly between the expected density data and the actual density data, identification of the type of the road irregularity based on the certain pre-determined pattern of the density data can be initiated.

In some implementations, such anomaly can be used to further confirm that the road irregularity exists after the identification of the type of the road irregularity based on the certain pre-determined pattern of the density data.

At 940, the vehicle is controlled in response to the identification (e.g., detection) of the road irregularity. For example, in response to determining that the speed bump, the pothole, or the hill exists, the vehicle may slow down to a certain pre-determined speed within certain pre-defined or programmed distance from the speed bump. For example, in response to determining that the cliff or the drop-off exists, the vehicle may come to a stop or slow down to a certain pre-determined speed within certain pre-defined or programmed distance from the cliff or the drop-off or make a de-tour. In some implementations, in case for non-autonomous vehicles, in response to determining that the road irregularity exists, the processor may execute instructions to display warning or notify driver of the warning through a user interface (e.g., the user interface 135) or an electronic communication interface (e.g., the communication interface 137). For example, warning or notification may be displayed in a display of the user interface or notified to the driver through audio communications (e.g., audio communication of the user interface 135 described above).

Figure 10:
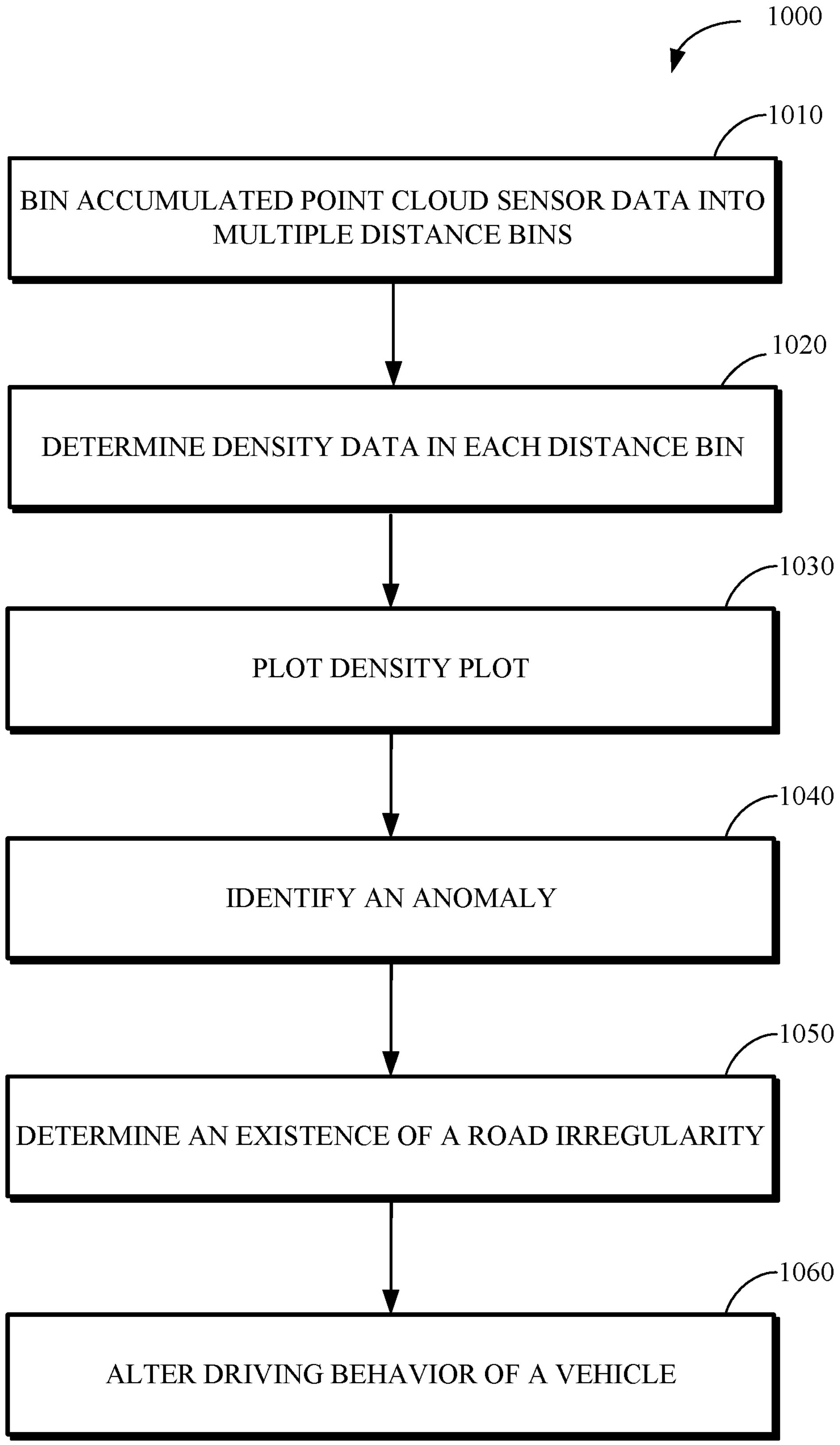
FIG. 10 is a flowchart diagram of an example of a technique for identifying a road irregularity using a density plot.

FIG. 10 is a flowchart diagram of an example of a technique 1000 for identifying a road irregularity using a density plot. The technique 1000 can be implemented by using a processor of a vehicle (such as the processor 133), a controller (such as the controller 130), and a sensor (e.g., the sensor 136, the on-vehicle sensor 209, or any of the sensors depicted in FIGS. 4 and 5A-5C) of or connected to the vehicle. Moreover, the technique 1000 can be implemented using the vehicle 100 of FIG. 1, vehicle transportation and communication system 200 of FIG. 2, the technique 900 of FIG. 9, any system, components, graphs, and implementations depicted and described with respect to FIG. 3-9.

At 1010, accumulated point cloud data obtained from the sensor is binned into multiple distance bins. For example, after the ground segmentation is applied to the point cloud data obtained from the sensor of or connected to the vehicle and/or the ground points of the point cloud data may be accumulated, accumulated ground points of the point cloud data or accumulated point cloud data can be binned into the multiple distance bins. For example, the ground points may be accumulated by simply buffering point cloud data from prior frames and transforming them to a current vehicle frame, using pose estimate at each point cloud scan. For example, the ground points may be accumulated by accumulating the point cloud data.

For example, actual ground points may be accumulated and binned into 1D multiple distance bins. For example, the processor of the vehicle may execute instructions to determine each 1D bin to have certain pre-determined distance (e.g., 10 cm) within a pre-determined threshold distance (e.g., 50 m) ahead of the vehicle (e.g., direction parallel to the vehicle's x-axis). For example, the pre-determined threshold distance may be a distance starting from the center of the vehicle and extending forward to (or ahead) of the vehicle. As the vehicle is traversing the road, the processor of the vehicle may analyze the sensor data collected in real-time to apply ground segmentation, and bin the sensor data (e.g., point cloud data) into multiple 10 cm distance bins.

In some implementations, multiple distance bins may be 2D bins as shown in FIG. 6B, where actual ground points may be accumulated and binned in a similar manner as done in one-dimensional (1D) multiple distance bins. For example, the processor of the vehicle may execute instructions to determine each 2D bin to have certain pre-determined dimension (e.g., 10 cm×10 cm) within a pre-determined threshold distance (e.g., 50 m) ahead of the vehicle (e.g., direction parallel to the vehicle's x-axis). For example, the pre-determined threshold distance may be distance starting from the center of the vehicle and extending forward to (or ahead) of the vehicle. As the vehicle is traversing the road, the processor of the vehicle may analyze the sensor data collected in real-time to apply the ground segmentation as described above, and bin the sensor data (e.g., point cloud data) into multiple 10 cm×10 cm distance bins. Then the processor of the vehicle may determine or identify the density of the sensor data contained in each distance bin for one or more of the multiple distance bins such that a density pattern (such as the patterns of road irregularities described above) can be determined.

At 1020, density data of each distance bin is determined. For example, the processor of the vehicle may determine or identify density of the sensor data contained in each distance bin for one or more of the multiple distance bins such that a density pattern (such as the patterns of road irregularities described above) can be determined.

For example, for the 2D distance bins, a value for the respective density of the sensor data in each 2D distance bin may be computed based on respective number of pixels.

At 1030, density plot is plotted. For example, the density plot may have density data on a y-axis and a distance ahead of the vehicle on a x-axis. For example, expected density data and actual density data may be plotted. For example, the density plot may correspond to the example density plot 800 of FIG. 8A.

In some implementations, pattern matching technique (e.g., wavelet transforms, convolution with kernel function) may supplant or may be used in addition to the density plot. For example, the pattern matching technique may be used to detect or identify expected density pattern and actual density pattern, and these two patterns may be compared with each other.

At 1040, an anomaly is identified in the density plot. For example, the anomaly in the density plot may be identified based on a comparison of the actual density data (or the pattern of the actual density data) to the expected density data (or the pattern of the expected density data) at the respective distances ahead of the vehicle. For example, identifying the anomaly in the density plot may include identifying respective differences between the actual density data and the expected density data, and detecting, based on the respective differences, a presence of patterns representing a density data deviation. For example, the anomaly may correspond to the circled portion 815 of the density plot 810 of FIG. 8B, where the circled portion represents noticeably high difference or high density deviation between 15 m and 22 m. Such portion of high density deviation may correspond to a portion of the road irregularity. For example, responsive to determining that the density deviation exceeds a pre-determined threshold (e.g., 700 points per 10 cm bin), the processor may determine that corresponding distances when the density deviation excess the pre-determined threshold include the portion of the road irregularity or the presence of patterns for the road irregularity.

In some implementations, such anomaly can be used prior to determining whether the road irregularity exists based on the corresponding density patterns for the road irregularity. For example, responsive to determining that there is such anomaly between the expected density data and the actual density data, identification of the type of the road irregularity based on the certain pre-determined pattern of the density data can be initiated.

In some implementations, such anomaly can be used to further confirm that the road irregularity exists after the identification of the type of the road irregularity based on the certain pre-determined pattern of the density data.

At 1050, an existence of the road irregularity is determined. For example, responsive to identifying that there is the anomaly, the processor may determine whether certain pattern that matches density pattern of any type of the road irregularity. For example, the road irregularity can be identified or determined to correspond to a speed bump in response to determining that the actual density data exhibit a pattern where the actual density data (e.g., density curve in the density plot or in the density pattern) ascends from a normal density range to a high density range, descends from the high density range to a zero density, and ascends from the zero density to the normal density range. A corresponding position (e.g., region) for the zero density may include a portion of the speed bump.

For example, the road irregularity can be identified or determined to correspond to a pothole in response to determining that the actual density data exhibit a pattern where the actual density data descends from a normal density range to a zero density, ascends from the zero density to a high density range, and descends from the high density range to the normal density range. A corresponding position for the zero density may include a portion of the pothole. For example, the actual density pattern of normal-zero-high-normal may correspond to regions (e.g., regions) described in FIG. 5A.

For example, the road irregularity can be identified or determined to correspond to a road elevation or a hill in response to determining that the actual density data exhibit a pattern where the actual density data ascends from a normal density range to a high density range, and descends from the high density range to the normal density range. A corresponding position for the high density range may include a portion of the road elevation or the hill. For example, the density pattern of normal-high-normal may correspond to regions described in FIG. 5B.

For example, the road irregularity can be identified or determined to correspond to a cliff, a drop-off, or a road descent in response to determining that the actual density data exhibit a pattern where the actual density data descends from a normal density range to a zero density, and the zero density stays long enough (e.g., certain pre-determined time). A corresponding position for the zero density or a position where the density data changes from the normal density range to the zero density may include a portion of the cliff, the drop-off, or the road descent. For example, the density pattern of normal-zero may correspond to regions described in FIG. 5C.

At 1060, a driving behavior of the vehicle is altered. For example, the vehicle may be controlled in response to the identification (e.g., detection) of the road irregularity. For example, in response to determining that the speed bump, the pothole, or the hill exists, the vehicle may slow down to a certain pre-determined speed within certain pre-defined or programmed distance from the speed bump. For example, in response to determining that the cliff or the drop-off exists, the vehicle may come to a stop or slow down to a certain pre-determined speed within certain pre-defined or programmed distance from the cliff or the drop-off or make a de-tour.

In some implementations, in case for non-autonomous vehicles, in response to determining that the road irregularity exists, instead of the driving behavior of the vehicle being altered, the processor may execute instructions to display warning or notify driver of the warning through a user interface (e.g., the user interface 135) or an electronic communication interface (e.g., the communication interface 137). For example, warning or notification may be displayed in a display of the user interface or notified to the driver through audio communications (e.g., audio communication of the user interface 135 described above).

Implementations according to this disclosure result in improvements to existing or conventional method of detecting the road irregularities. Such improvements can be achieved by at least determining density data of the accumulated point cloud data or sensor data and determining a pattern of the density data, where the pattern can correspond to existence of one or more road irregularities. Moreover, density plot can be generated based on the density data, and an anomaly in the density plot can be identified based on a comparison of the density data to expected density data. An existence of the road irregularity can be determined based on the anomaly.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for detecting a road irregularity, comprising:

accumulating, over time, point cloud data from a sensor of a vehicle at different distances ahead of the vehicle;

applying ground segmentation to the point cloud data to separate ground points from non-ground point cloud data;

identifying density data of the point cloud data at the different distances ahead of the vehicle, wherein the density data includes density patterns;

binning at least some of the point cloud data into distance bins, with each of the distance bins corresponding to a defined distance interval within a threshold distance ahead of the vehicle, wherein the ground points separated by the ground segmentation are binned into the distance bins, and the density patterns are derived from the density of the ground points within each distance bin;

identifying the road irregularity based on the density patterns of the density data; and controlling the vehicle in response to the road irregularity.

2. The method of claim 1, wherein identifying the density data of the point cloud data at the different distances ahead of the vehicle comprises:

determining a respective density data of a respective distance bin for one or more of the distance bins.

3. The method of claim 1, further comprising:

generating a density plot based on the density data, wherein the different distances ahead of the vehicle are divided into regions and one of the regions correspond to where the irregularity has no density data.

4. The method of claim 3, wherein identifying the road irregularity based on the density data comprises:

determining that the density patterns include a density pattern that is a speed bump comprising: a high density range, a zero density, and a normal density range, wherein a corresponding position for the zero density includes a portion of the speed bump; and identifying that the road irregularity corresponds to the speed bump in response to determining that the density data exhibit the density pattern where the density data in the density plot ascends from the normal density range to the high density range, descends from the high density range to a zero density, and ascends from the zero density to the normal density range, wherein a corresponding position for the zero density corresponds to a region after the speed bump.

5. The method of claim 3, wherein identifying the road irregularity based on the density data comprises:

determining that the density patterns include a density pattern that is a pothole comprising: a normal density range to a zero density, the zero density to a high density range, and the high density range to the normal density range, and that a corresponding position for the zero density includes a portion of the pothole; and identifying that the road irregularity corresponds to the pothole in response to determining that the density data exhibit the density pattern where the density data descends from a normal density range to a zero density, ascends from the zero density to a high density range, and descends from the high density range to the normal density range, and that a corresponding position for the zero density correspond to a portion of the pothole.

6. The method of claim 3, wherein identifying the road irregularity based on the density data comprises:

identifying an anomaly in the density plot based on a comparison of the density data to expected density data at the different distances ahead of the vehicle; and determining an existence of the road irregularity based on the anomaly.

7. The method of claim 6, wherein identifying the anomaly in the density plot comprises:

identifying respective differences between the density data and the expected density data; and distinguishing the anomaly based on the respective differences by detecting a presence of patterns representing a density data deviation.

8. The method of claim 7, wherein distinguishing the anomaly is performed by using a wavelet transform function or a convolution with a kernel function to detect the presence of patterns representing the density data deviation.

9. The method of claim 3, wherein the density plot is a two-dimensional plot, and wherein identifying the density data comprises:

binning at least some of the point cloud data into two-dimensional distance bins, wherein:

each of the two-dimensional distance bins corresponds to a respective defined distance interval within a threshold distance ahead of the vehicle; and generating the density plot based on the density data comprises generating a plot corresponding to the two-dimensional distance bins based on respective number of pixels of at least some of the two-dimensional distance bins.

10. A device for detecting a road irregularity, the device comprising:

one or more sensors of a vehicle;

a non-transitory computer readable medium; and a processor configured to execute instructions stored on the non-transitory computer readable medium to:

accumulate, over time, point cloud data from a sensor of the vehicle at different distances ahead of the vehicle;

apply ground segmentation to the point cloud data to separate ground points from non-ground point cloud data;

identify density data of the point cloud data at the different distances ahead of the vehicle, wherein the density data includes density patterns;

bin at least some of the point cloud data into distance bins, with each of the distance bins corresponding to a defined distance interval within a threshold distance ahead of the vehicle, wherein the ground points separated by the ground segmentation are binned into the distance bins, and the density patterns are derived from the density of the ground points within each distance bin;

identify the road irregularity based on the density patterns of the density data; and control the vehicle in response to the road irregularity.

11. The device of claim 10, wherein to identify the density data of the point cloud data at the different distances ahead of the vehicle comprises to:

determine a respective density data of a respective distance bin for one or more of the distance bins.

12. The device of claim 10, wherein the instructions further comprise to:

generate a density plot based on the density data.

13. The device of claim 12, wherein to identify the road irregularity based on the density data comprises to:

determining that the density patterns include a density pattern that is a speed bump comprising: a high density range, a zero density, and a normal density range, wherein a corresponding position for the zero density includes a portion of the speed bump; and identify that the road irregularity corresponds to the speed bump in response to determining that the density data exhibit the density pattern where density data in the density plot ascends from the normal density range to the high density range, descends from the high density range to a zero density, and ascends from the zero density to the normal density range, wherein a corresponding position for the zero density corresponds to a region after the speed bump.

14. The device of claim 12, wherein to identify the road irregularity based on the density data comprises to:

determining that the density patterns include a density pattern that is a pothole comprising: a normal density range to a zero density, the zero density to a high density range, and the high density range to the normal density range, and that a corresponding position for the zero density includes a portion of the pothole; and identify the road irregularity corresponds to the pothole in response to determining that the density data exhibit the density pattern where the density data descends from a normal density range to a zero density, ascends from the zero density to a high density range, and descends from the high density range to the normal density range, wherein a corresponding position for the zero density correspond to a portion of the pothole.

15. The device of claim 12, wherein to identify the road irregularity based on the density data comprises to:

identify an anomaly in the density plot based on a comparison of the density data to expected density data at the different distances ahead of the vehicle; and determine an existence of the road irregularity based on the anomaly.

16. The device of claim 15, wherein identifying the anomaly in the density plot comprises to:

identify respective differences between the density data and the expected density data at the different distances ahead of the vehicle; and distinguish the anomaly based on the respective differences by detecting a presence of patterns representing a density data deviation.

17. The method of claim 1, further comprising:

identifying the density data comprises determining a respective density data of a respective distance bin for one or more of the distance bins, wherein the respective density data comprises a number of point cloud returns in the respective distance bin; and identifying the road irregularity comprises: generating a density plot based on the density data, wherein the different distances ahead of the vehicle are divided into regions and one of the regions corresponds to where the road irregularity has no density data; and identifying the road irregularity based on the density plot.

18. The device of claim 10, wherein the bin includes the defined distance interval ahead of the vehicle and a width.

* * * * *